(12) United States Patent
Damnjanovic et al.

(10) Patent No.: US 7,190,964 B2
(45) Date of Patent: Mar. 13, 2007

(54) REVERSE LINK POWER CONTROL IN 1XEV-DV SYSTEMS

(75) Inventors: Aleksandar Damnjanovic, San Diego, CA (US); Farideh Khaleghi, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 746 days.

(21) Appl. No.: 10/040,542

(22) Filed: Jan. 4, 2002

(65) Prior Publication Data

US 2003/0050084 A1    Mar. 13, 2003

Related U.S. Application Data

(60) Provisional application No. 60/334,319, filed on Nov. 30, 2001, provisional application No. 60/335,224, filed on Nov. 1, 2001, provisional application No. 60/313,451, filed on Aug. 20, 2001.

(51) Int. Cl.
*H04B 7/00* (2006.01)

(52) U.S. Cl. .................. 455/522; 455/69; 455/442; 370/318; 370/331

(58) Field of Classification Search ............... 455/436, 455/442, 443, 444, 69, 522; 370/318, 331
See application file for complete search history.

(56) References Cited

U.S. PATENT DOCUMENTS 5,991,284 A * 11/1999 Willenegger et al. ....... 370/335

| | | | |
|---|---|---|---|
| 6,434,367 B1 * | 8/2002 | Kumar et al. | 455/70 |
| 6,728,218 B1 * | 4/2004 | Corke et al. | 370/252 |
| 6,901,046 B2 * | 5/2005 | Hsu et al. | 370/204 |
| 2002/0105974 A1 * | 8/2002 | Cheng et al. | 370/510 |
| 2002/0142791 A1 * | 10/2002 | Chen et al. | 455/522 |
| 2002/0165004 A1 * | 11/2002 | Chen et al. | 455/522 |
| 2005/0135320 A1 * | 6/2005 | Tiedemann et al. | 370/338 |

FOREIGN PATENT DOCUMENTS

| EP | 0946070 | 9/1999 |
|---|---|---|
| EP | 1059736 | 12/2000 |
| WO | WO0036762 | 6/2000 |

OTHER PUBLICATIONS

Motorola, Nokia, Texas Instruments & LSI Logic; 1XTREME Physical Specification for Integrated Data and Voice Services in cdma2000 Spread Spectrum Systems; 206 pgs.

LG Electronics, Lucent Technologies, Samsung Electronics, LSI Logic, QUALCOMM Incorporated; Updated Joint Physical Layer Proposal for 1xEV-DV; Jun. 11, 2001; 87 pgs.

(Continued)

*Primary Examiner*—Edward F. Urban
*Assistant Examiner*—Raymond S. Dean
(74) *Attorney, Agent, or Firm*—Coats & Bennett, P.L.L.C.

(57) ABSTRACT

The transmit power of a mobile station on the reverse link channel that carries channel state information, rate selection, and/or sector selection information is power controlled separately from the reverse link traffic channels when the mobile station is in soft handoff. The serving base station in the active set for the mobile station controls the mobile station transmit power on the rate control channel. The non-serving base stations control the transmit power on the reverse traffic channel.

85 Claims, 11 Drawing Sheets

OTHER PUBLICATIONS

Motorola, Nokia, Texas Instruments, Philips and Altera; Joint 1XTREME Proposal for 1xEV-DV; Jun. 11, 2001; 41 pgs.

S. Parkvall, E. Dahlman, P. Frenger, P. Beming, M. Persson, The Evolution of WCDMA Towards Higher Speed Downlink Packet Data Access; 2001; 5 pgs.

3rd Generation Partnership Project 2 "3GPP2"; Concepts, Architecture and Mechanisms (Release C3) rev 6.0; Jul. 2001; 25 pgs.

3rd Generation Partnership Project 2 "3GPP2", cdma2000 High Rate Packet Data Air Interface Specification; Oct. 27, 2000; 441 pgs.

* cited by examiner

REVERSE LINK POWER CONTROL IN 1XEV-DV SYSTEMS

RELATED APPLICATIONS

This application claims priority from U.S. Provisional Application No. 60/313,451 filed Aug. 20, 2001 entitled "1xEV-DV RL Framework"; U.S. Provisional Application No. 60/335,224 filed Nov. 1, 2001 entitled "1xEV-DV Reverse Link Power Control in Soft Handoff"; and U.S. Provisional Application No. 60/334,319 filed Nov. 30, 2001 entitled "1xEV-DV Reverse Link Power Control in Soft Handoff."

BACKGROUND OF THE INVENTION

The present invention relates generally to methods of power control for CDMA communication systems and, more particularly, to methods of reverse link power control during soft handoff in a wireless communication system.

Numerous access schemes exist to allow multiple users to share a communication medium. One such access scheme is known as code division multiple access (CDMA). In CDMA systems, multiple users share the same carrier frequency and may transmit simultaneously. Each user has its own pseudo-noise (PN) sequence, which is approximately orthogonal to the PN sequences of other users. Transmissions to or from individual users are imprinted with that user's PN sequence. The receiver selects the desired signal, which combines in the communication with unwanted signals, by correlating the received signal with the PN sequence of the desired signal. All other signals are spread by the PN sequence and appear as noise to the receiver.

The current standard for CDMA systems in the United States is contained in a specification published by the Telecommunications Industry Association and Electronics Industry Association (TIA/EIA), known as IS-95. New standards for wideband CDMA are currently being developed in North America, Europe, and Japan, which offer significant performance improvements compared to the current CDMA standard. One such standard is known as cdma2000. cdma2000 is a wideband, spread-spectrum radio interface that uses CDMA technology to satisfy the needs of third generation wireless communication systems. Several enhancements of the cdma2000 standard have been proposed to facilitate the gradual evolution of third generation wireless communication systems. The cdma2000 variant known as 1xEV-DO is being developed to provide high-speed packet data services as an overlay to existing circuit-switched networks. The next step in the evolution of the cdma2000 technology is the variant known as 1xEV-DV. Networks implementing this standard will provide integrated voice and high-rate data services.

CDMA systems are interference-limited systems. Since all mobile stations operate at the same frequency, internal interference generated within the system plays a critical role in determining system capacity and voice quality. The transmit power from each mobile station must be controlled to limit interference while maintaining desired performance objectives, e.g., bit error rate (BER), frame error rate (FER), capacity, dropped-call rate, coverage, etc.

Two closely related techniques used in CDMA systems to reduce interference are power control and soft handoffs. Power control is used on the reverse link in CDMA systems to control the power of signals received at each base station from the mobile stations. The purpose of power control is to assure that each mobile station served by a particular base station provides approximately the same signal level to the receiver at that sector. In CDMA systems, the system capacity is maximized if the transmit power level of each mobile station is controlled so that its signals arrive at the base station receiver with the minimum required signal-to-noise ratio (SNR) or signal-to-interference ratio (SIR). The target value for the received power level is the minimum level possible that allows the link to meet the predetermined performance objectives.

As the mobile station moves around within the network, the channel conditions change continuously due to fast and slow fading, shadowing, number of users, external interference, and other factors. Power control algorithms dynamically control the transmitted power on the reverse link to maintain the minimum SNR or SIR at the base station under all conditions. Both open loop and closed loop power control are used on the reverse link. In open loop control, the mobile station monitors the received signal strength on the forward link and varies its transmit power inversely in proportion to the measured signal strength. Fading sources in mobile radio systems require much faster power control than is possible with open loop control. Fast power control is provided by the closed loop power control mechanism. In closed loop power control, the base station measures the strength of the received signal from the mobile station and sends power control commands to the mobile station requesting the mobile station to either increase or decrease its transmit power. The power control commands typically comprise power control bits (PCBs), which are sent at a rate of 800 bps. A bit value of "1" commands the mobile station to decrease its transmit power. A bit value of "0" commands the mobile station to increase its transmit power.

Another technique used in CDMA communication systems to reduce interference is known as a soft handoff. A handoff is the act of transferring support for a mobile station from one sector to another when the mobile station moves between cells. In a traditional "hard" handoff, the connection to the current base station is broken and a connection is made with the new base station to resume communication with the mobile station. This is known as a "break before make" handoff. Because all sectors in a CDMA system use the same frequency, it is possible to make the connection to the new base station before terminating the connection with the current base station. This is known as a "make before break" or "soft" handoff. A soft handoff requires less power, which reduces interference and increases system capacity.

During soft handoff, each base station participating in the handoff receives transmissions from the mobile station over its assigned code channel. The code channel assignments are independent and, in general, will be different in each cell. The mobile station transmit power is controlled by the base station that is receiving the best signal, so that the minimum necessary power is transmitted by the mobile station. This is a key requirement if the maximum overall system capacity is to be achieved. Each base station participating in a soft handoff makes a separate determination of the power control bit (PCB) to be sent to the mobile station. The mobile station processes the power control bits from each of the base stations in its active set separately and performs an "or of the downs" logic operation. That is, if any of the base stations transmits a "down" bit, the mobile station reduces its transmit power. The net result is that the transmit power level of the mobile station is reduced to the minimum level needed to be received by the base station with the best reverse link. Thus, the soft handoff mechanism reduces interference in CDMA systems.

In 1xEV systems, the mobile station receives data on the forward link from only one base station at any given time. Instead of combining transmit energy from multiple base stations, the mobile station switches communications from one base station to another. This process is known as sector selection. The mobile station measures the instantaneous carrier-to-interference (C/I) ratio of the pilot signal received from each base station in its active set and requests service from the base station providing the strongest signal.

Another feature of 1xEV systems is the use of line adaptation on the forward link. Transmissions from a base station to the mobile stations are time-multiplexed and transmitted at full power. At any given time, a given base station is transmitting to only one mobile station. The slot times and data rates allocated for transmissions to the mobile stations depend on the channel conditions seen by each mobile station. The mobile stations measure the signal quality on the forward link and send rate control information in the form of either signal quality measurements or data rate requests back to the base station on the reverse link. The base station selects a forward link data rate and assigns slot times for a mobile station based on the rate control information from that mobile station. The base stations vary the modulation and encoding used for the forward link channel, depending on the requested data rate.

The sector selection and data rate requests are transmitted from the mobile station on a reverse link channel that is referred to herein as the reverse rate control channel (R-RCCH). In 1xEV-DO systems, the R-RCCH is known as the data rate control (DRC) channel. In 1xEV-DV systems, the R-RCCH channel is known as the reverse channel quality indicator channel (R-CQICH). In both cases, the R-RCCH conventionally has a fixed power offset relative to the reverse pilot channel (R-PICH). In order to serve a mobile station, the serving base station must be able to receive and reliably decode the R-RCCH.

A mobile station in soft handoff for which the serving base station is different from the best reverse link sector is said to experience "link imbalance." The factors causing link imbalance are numerous: different forward and reverse link frequencies, different sector transmit power ratings (e.g., when deploying both macro-cells and micro-cells in the same frequency assignment), different transmission losses (e.g., arising from antenna misalignments), and different base station receiver sensitivities (e.g., different reverse link loading or different receiver noise figures). Link imbalances in excess of 3 dB are the norm, and link imbalances in excess of 6 dB are not infrequent in deployed systems.

A mobile station in soft handoff experiencing link imbalance may not be able to receive service on the forward link since the reverse link is power controlled by a base station other than the serving base station on the forward link. The base station receiving the strongest signal will force the mobile station to reduce its transmit power to the level needed to maintain the minimum SNR at that base station. Due to differences in path loss to the serving sector and the reverse link sector, the serving sector may not be able to receive and reliably decode the R-RCCH. If the serving sector is unable to decode the rate control channel, the mobile station cannot be scheduled for service. Indeed, the serving base station may not even be aware that it was selected by the mobile station as the serving base station.

BRIEF SUMMARY OF THE INVENTION

The present invention relates to a method of power controlling the mobile station on the reverse link during soft handoff while the mobile station is experiencing link imbalance. The power control method of the present invention ensures that the serving sector on the forward link is able to reliably decode rate control and sector selection information transmitted from the mobile station on the reverse rate control channel. This objective is achieved by independently power controlling the reverse traffic channel (R-TCH) and the reverse rate control channel (R-RCCH). Variants of the present invention include both explicit and implicit power control for the R-RCCH.

The explicit method divides the forward common power control channel (F-CPCCH) into subchannels—one used to power control the traffic channel and one used to power control the rate control channel. This may be accomplished, for example, by assigning different time slots for the power control subchannels. The implicit method modifies the way the mobile station interprets power control commands from the base station. In the implicit method, the mobile station uses power control bits from the serving base station to power control the rate control channel. The transmit power on the traffic channel is controlled by non-serving base stations using "or of the downs" voting. One advantage of the implicit method is that it does not require additional resources (e.g., F-CPCCH subchannels) to implement.

In contrast to power control methods used in the past, the relative gain of the traffic channel compared to the pilot channel is not fixed. In prior art systems, the ratio of traffic channel gain to pilot channel gain, referred to herein as the traffic channel gain ratio, is set at a value that minimizes power consumption. A mobile station using the power control method of the present invention will deviate from the optimal gain ratio. According to one aspect of the invention, a bounding criterion is used to maintain the gain ratio within a desired range. When the gain ratio reaches a maximum value, the upward adjustment of the mobile station transmit power level on the traffic channel is clipped. That is, the mobile station will conditionally ignore power control bits, instructing the mobile station to increase its power level. Further, once the maximum gain ratio is reached, the serving base station may conditionally power control the reverse traffic channel as well as the reverse pilot channel. That is, when the maximum gain ratio is reached, the mobile station may reduce its transmit power on both the reverse traffic channel and reverse pilot channel in response to a "down" command from the serving base station. Similarly, when the minimum gain ratio is reached, the upward adjustment of the pilot channel power level may be clipped, and the transmit power level of the pilot channel may be conditionally controlled by the non-serving base stations.

DETAILED DESCRIPTION OF THE INVENTION

Figure 1:
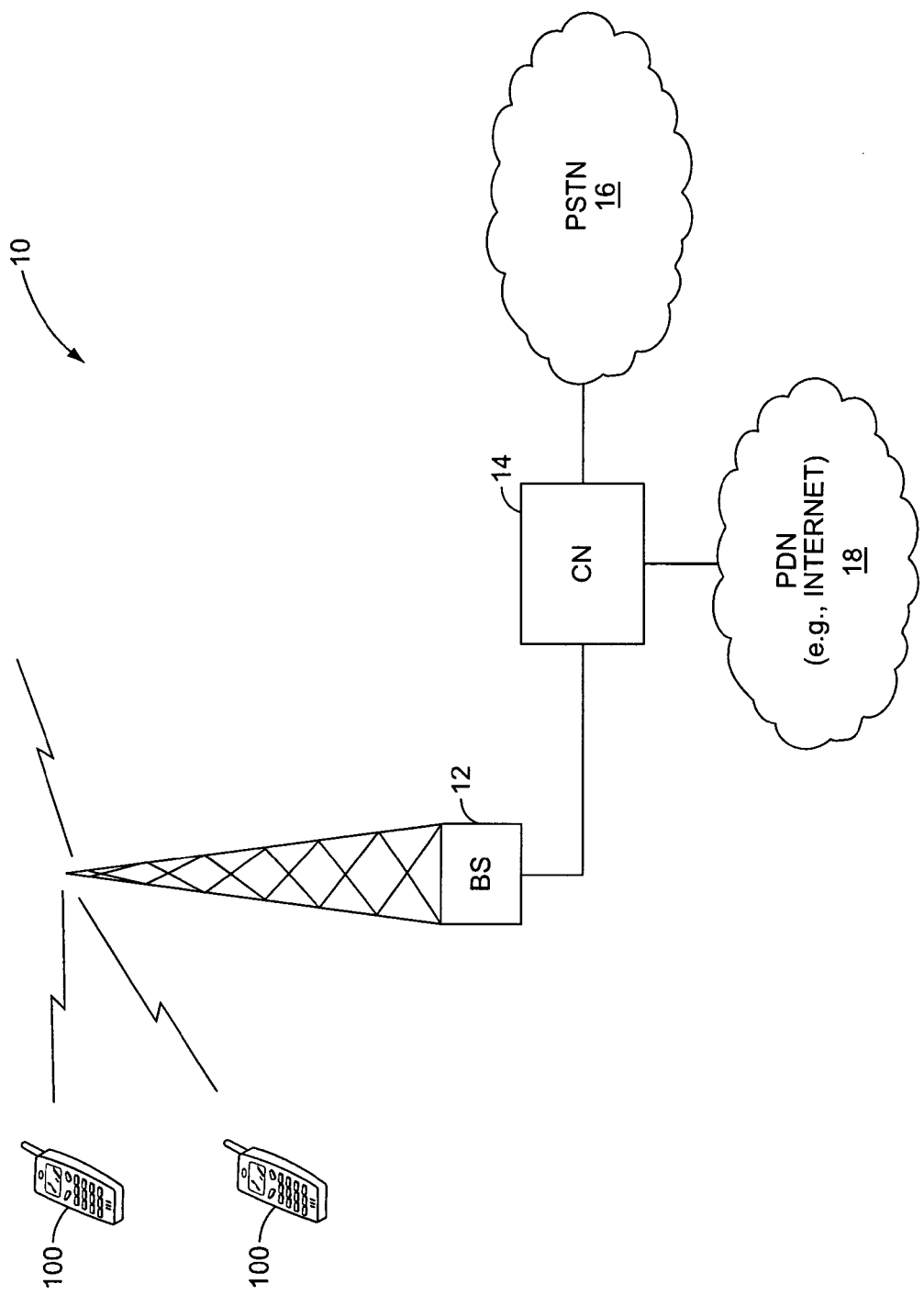
FIG. 1 is a block diagram of a mobile communication network.

Referring now to FIG. 1, the present invention will be discussed in the context of a wireless communications network 10 supporting over-the-air communications between mobile stations 100 and fixed stations generally known as base stations 12. Base stations 12 connect via a core network (CN) 14 to external wireline networks such as the Public Switched Telephone Network (PSTN) 16, the Integrated Services Digital Network (ISDN), and/or a Packet Data Network (PDN) 18, such as the Internet. Each base station 12 is located in and provides wireless communication services to a geographic region referred to as a cell, which may comprise one or more sectors. In general, there is one base station 12 for each cell or sector. A single base station may serve multiple sectors.

Within sector, there may be a plurality of mobile stations 100 that communicate via a radio link with a serving base station 12. The base station 12 allows the users of the mobile stations 100 to communicate with other mobile stations 100, or with users connected to the external network. The CN 14 routes calls to and from the mobile station 100 through the appropriate base station 12.

Figure 2:
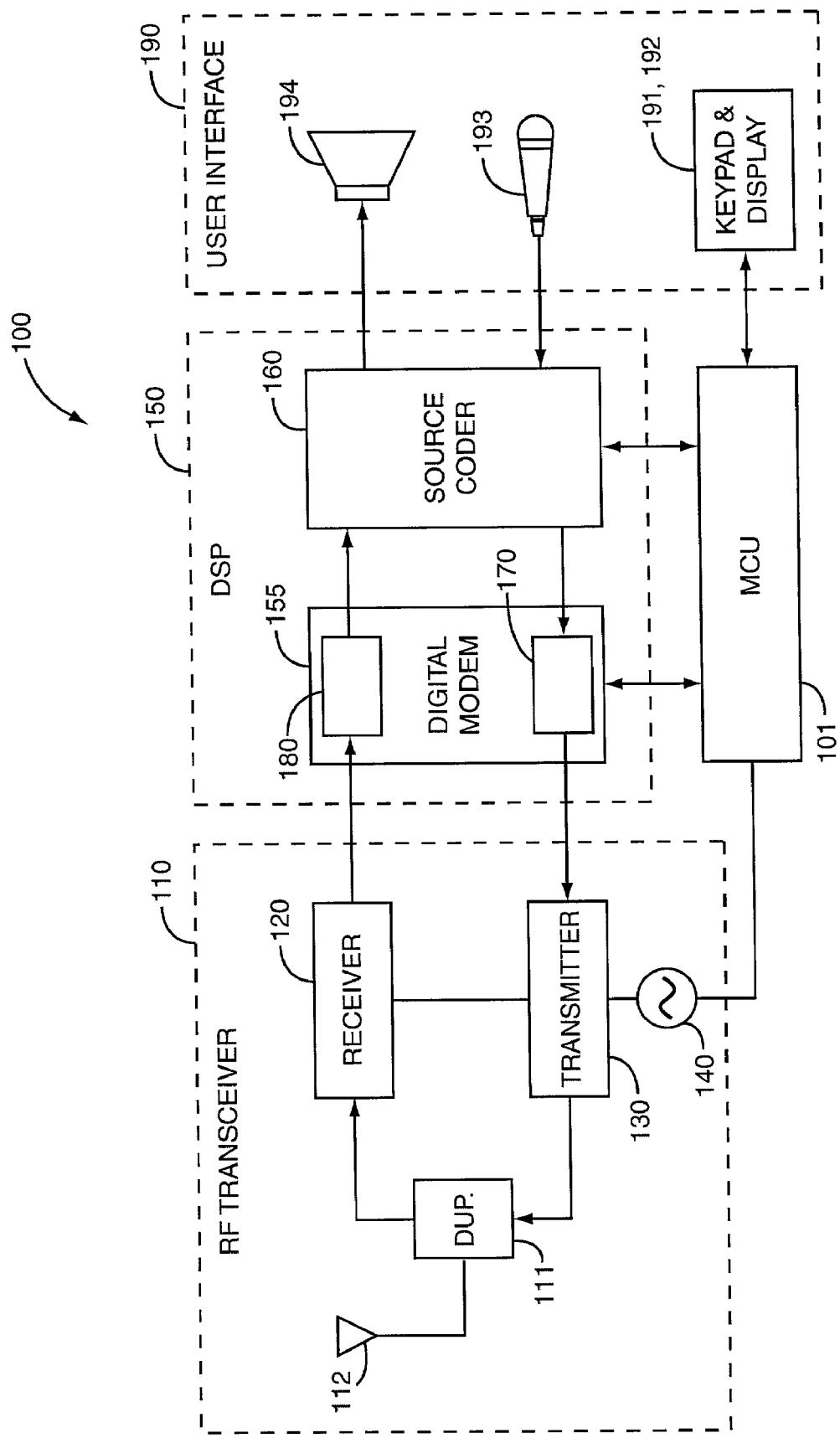
FIG. 2 is a functional block diagram of a mobile station in the mobile communication network of FIG. 1.

FIG. 2 is a block diagram of a mobile station 100. The term mobile station 100 as used herein includes a cellular radiotelephone; a Personal Digital Assistant (PDA) that may combine a cellular radiotelephone with data processing, facsimile and data communications capabilities; a conventional laptop and/or palmtop computer equipped with a radiotelephone transceiver, or other appliance that includes a radiotelephone transceiver. Mobile stations 100 may also be referred to as "pervasive computing" devices.

Mobile station 100 is a fully functional mobile radio transceiver capable of transmitting and receiving signals over a RF channel. Exemplary standards that may be implemented by the mobile station 100 include, but are not limited to, TIA/EIA/IS-2000 and TIA/EIA/IS-856 standards. Mobile station 100 comprises a microcontroller unit (MCU) 101, a RF transceiver 110, a digital signal processor (DSP) 150, and a user interface 190. Mobile station 100 may additionally include an external interface for communication with a computer, local area network, or other device.

RF transceiver 110 establishes a link for wireless communications with the base station 12. RF transceiver 110 comprises a receiver 120, transmitter 130, frequency synthesizer 140, duplexer or switch 111, and antenna 112. Receiver 120 receives downlink or forward link communications from the base station 12. Receiver 120 amplifies and downconverts received signals to a baseband frequency for processing by the DSP 150. Signals converted by receiver 120 to the baseband frequency are referred to herein as baseband signals.

Transmitter 130 sends uplink or reverse link communications to the base station 12. Transmitter 130 receives baseband signals from the DSP 150, which the transmitter 130 amplifies and uses to modulate an RF carrier at a directed power level. Frequency synthesizer 140 provides the reference signals used for frequency translation in the receiver 120 and transmitter 130. Transmitter 130 includes a variable gain amplifier (VGA) that allows adjustment of the transmit power. The gain of the VGA is adjusted responsive to power control commands from the base station 12 as described below.

Receiver 120 and transmitter 130 are coupled to antenna 112 by duplexer or switch 111. Duplexer 111 includes a duplex filter to isolate the transmitter 130 from the receiver 120. The duplex filter combines a transmit-band filter and receiver-band filter to provide the necessary isolation between the two paths.

DSP 150 comprises a digital modem 155 and source coder 160. Source coder 160 includes a speech coder (not shown) for digitizing and coding speech for transmission on the reverse link to the base station 12. Additionally, the speech coder decodes speech signals received from the base station 12 and converts speech signals into audio signals that are output to speaker 194. CDMA systems use an efficient method of speech coding and error recovery techniques to overcome the harsh nature of the radio channel. One speech coding algorithm frequently used in CDMA systems is Code Excited Linear Predictor (CELP) speech coding. Speech is typically encoded at rates of 9.6 kilobits per second or 13.3 kilobits per second. The details of speech coding are not material to the invention and, therefore, are not explained in detail herein.

The digital modem 155 processes digital signals to make communication over the propagation channel more robust. Digital modem 155 includes a digital modulator 170 and at least one demodulator 180. The digital modulator 170 superimposes the message waveform onto a carrier for radio transmission using techniques that guard against fading and other impairments of the radio channel while attempting to maximize bandwidth efficiency. Modulator 170 may also perform channel coding and encryption if used. The digital demodulator 180 detects and recovers the transmitted message. It tracks the received signal, estimates received signal strengths, rejects interference, and extracts the message data from noisy signals. Demodulator 180 also performs synchronization, channel decoding, and decryption if used.

The MCU 101 supervises the operation of the mobile station 100 and administers the procedures associated with the applicable communication protocol. The MCU 101 implements the communication protocols used by the mobile station 100. The communication protocol specifies timing, multiple access approach, modulation format, frame structure, power level, as well as many other aspects of mobile station operation. The MCU 101 inserts signaling messages into the transmitted signals and extracts signaling messages, such as power control commands, from the received signals. MCU 101 acts on signaling messages received from the base station 12 as set forth in the communication protocol. When the user enters commands via the user interface 190, the commands are passed to the MCU 101 for action.

One function performed by the MCU 101 is closed-loop power control. The MCU processes power control commands from the base stations in its active set, and adjusts its transmit power accordingly. As described in more detail below, the transmit power for the reverse link channel that carries channel state information, data rate requests, and/or sector selections is power controlled separately from the reverse traffic channel. The power control method of the present invention is described in more detail below.

Figure 3:
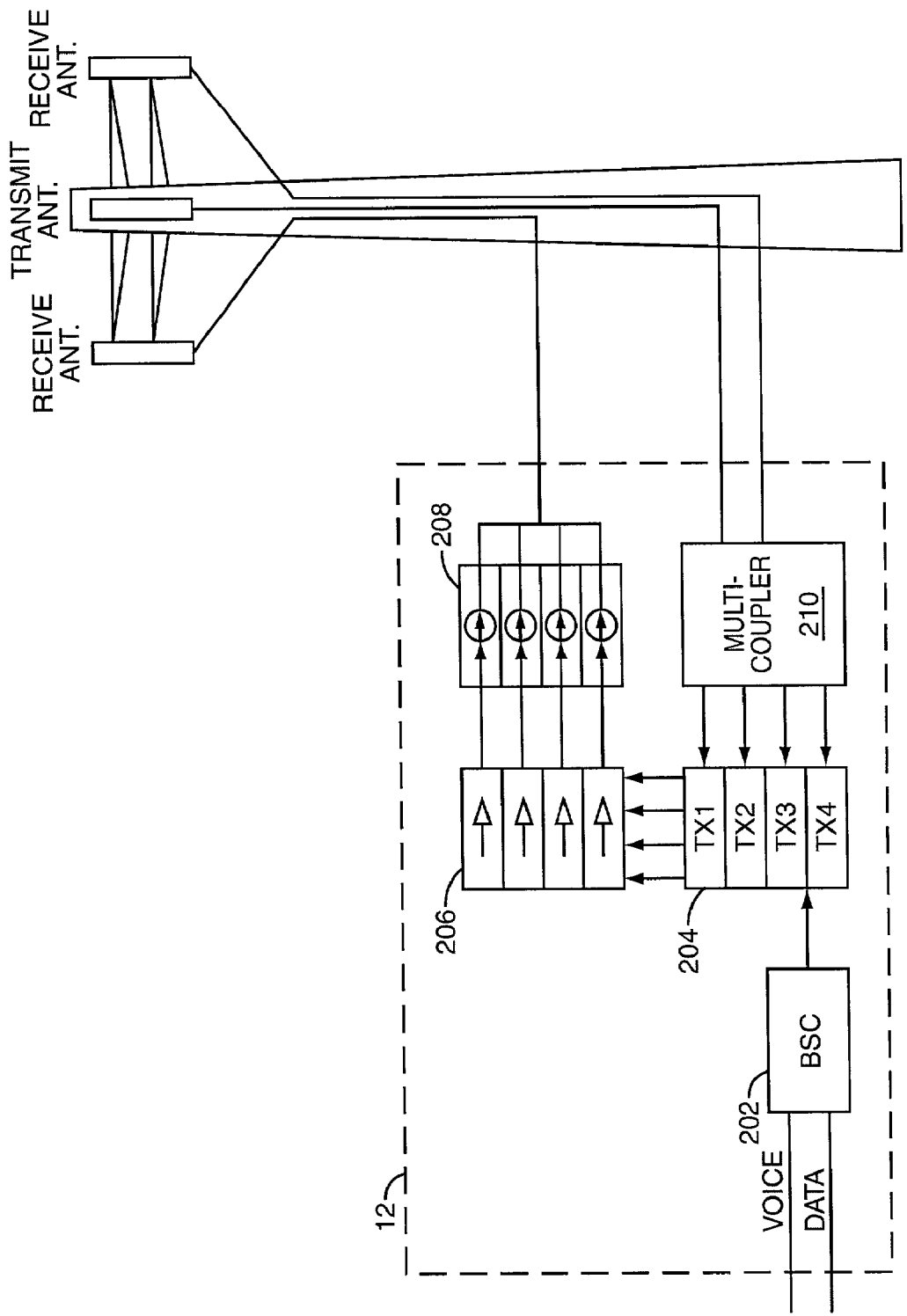
FIG. 3 is a functional block diagram of a base station in a mobile communication network.

FIG. 3 is a functional block diagram of a base station 12. The base station 12 includes a base station controller 202, a transceiver array 204, amplifier array 206, RF combiner 208, and receive multicoupler 210. The transceiver array 202 comprises a plurality of transceivers, which may, for example, comprise CDMA transceivers. The transmitter outputs of the transceivers are supplied to a corresponding high power RF amplifier in the amplifier array 206. The RF combiner 208 allows separate radio channels to be combined onto one or more antennas without interfering with each other. The combined RF signal is routed to the transmitter antenna 212, typically via low energy loss coaxial cable. Receiver antennas 214 are connected to the RF multicoupler 210 via low loss coaxial cables. The multicoupler 210 splits the received signals into multiple channels for respective transceivers. The receiver portion of the transceiver converts the RF signal to baseband signals and processes the baseband signals.

The present invention was originally developed for use in CDMA networks and therefore the discussion will focus on CDMA communication networks 10 based on the cdma2000 standard. The present invention is particularly useful in systems based on the first EVolution (1xEV) of the cdma 2000 standard, which includes both the 1xEVDO (Data Only) and 1xEVDV (Data and Voice) standards. These standards are incorporated herein by reference. However, the present invention could be adapted and employed in systems using other communication standards.

To aid in understanding the present invention, a brief overview is given below of reverse link power control, soft handoffs, and rate selection in 1xEV systems. After these concepts are briefly explained, the power control method of the present invention will be described.

Reverse Link Power Control in 1xEV Systems

In 1xEV systems, reverse link power control is used to control the power of mobile station transmit signals received at the base station 12. The purpose of reverse link power control is to ensure that each mobile station 100 served by the particular base station 12 provides approximately the same signal level to the base station receiver. As the mobile station 100 moves about in the network, the path loss from the mobile station 100 to the base station 12 may vary by as much as 80 dB. Thus, the power control algorithms used in CDMA systems should be capable of dynamically controlling the transmit power level of the mobile station 100 across a wide dynamic range while maintaining the desired performance objectives.

In cdma2000, both open loop and closed loop power control are employed. In open loop power control, the mobile station 100 estimates the path loss to the base station 12 by measuring the received power from all base stations 12 on the forward link channels (i.e., power in pilot, paging, sync, and traffic channels) and adjusting its transmit power based on the total power received. Measurement of the received power is based on an analog AGC (automatic gain control) voltage as is well known in the art. Other DSP based measurement techniques are also known and can be used to implement the present invention. The mobile station 100 adjusts its transmit power inversely in proportion to the received power. If the received power at the base station 12 is high, the mobile station 100 reduces its transmit power. On the other hand, if the received power is low, the mobile station 100 increases its transmit power.

Fading sources in multipath require much faster power control than is capable with open loop power control alone. The additional power adjustments required to compensate for fading are handled by the closed loop power control mechanism, which typically has a response time of 1.25 ms. The quicker response time gives the closed loop power control mechanism the ability to override the open loop power control mechanism in practical applications. Together, the two independent power control mechanisms cover a dynamic range of at least 80 dB.

The closed loop power control mechanism comprises two parts—inner loop power control and outer loop power control. The inner loop power control mechanism adjusts the mobile station transmit power to maintain the signal to noise ratio (SNR) as close as possible to a targeted set point. The outer loop power control mechanism adjusts the set point for a given mobile station 100.

In closed loop power control, the base station 12 measures the SNR sixteen times in each 20 ms frame. When the measured SNR is greater than the targeted value for the SNR, the base station 12 commands the mobile station 100 to decrease its power by $\delta$ dB. A typical value for $\delta$ is 1 dB. Otherwise, the base station 12 orders the mobile station 100 to increase its power by $\delta$ dB.

The power control commands are sent from the base station 12 in the form of power control bits (PCBs). A PCB having a value of "1" is interpreted by the mobile station 100 as a command to decrease its transmit power level by $\delta$ dB. Similarly, a PCB having a value of "0" is interpreted by the mobile station 100 as a command to increase its transmit power by $\delta$ dB. Thus, the mobile station 100 adjusts its power up or down relative to its open loop estimate by $\delta$ dB for each power control bit. There is no command to maintain the current transmit power level. A relatively constant transmit power level, however, may be maintained by transmitting alternating up and down commands from the base station 12 to the mobile station 100.

The base station 12 transmits PCBs to the mobile station 100 on the forward common power control channel (F-CPCCH). The base station 12 transmits continuously and at constant power on the F-CPCCH. In cdma2000, both the forward link and reverse link channels are organized into 20 ms frames. Each 20 ms frame is further subdivided into sixteen equal time intervals of 1.25 ms each, which are known as power control groups (PCGs). Thus, a single frame has sixteen PCGs. The transmission of a power control bit occurs on the F-CPCCH in the second PCG following the reverse link PCG in which the signal strength was estimated. For example, if the signal strength is estimated on PCG number two of a reverse link frame, then the corresponding power control bit must be sent on PCG number four of the forward link frame. Once the mobile station receives and processes the forward link channel, it extracts the power control bits from the forward traffic and either increases or decreases transmit power on the reverse traffic channel as needed to approach the targeted SNR or set point.

Because the relationship between SNR and frame error rate is non-linear, the base station 12 may adjust the targeted set point depending on factors such as vehicle speed and channel conditions. In general, performance as measured by FER deteriorates with increasing vehicle speed. Thus, the base station can adjust the set point to maintain the signal quality as measured by the FER.

In 1xEV systems, the gain of the reverse traffic channel is fixed relative to the reverse pilot channel (R-PICH). The base station 12 controls the transmit power level of the reverse pilot channel. After determining the appropriate transmit power level on the pilot channel based on open loop power control measurements and the power control bits received from the base station 12, the mobile station 100 computes the transmit power level for the traffic channel based on a fixed power offset stored in memory. The power offset between the reverse link traffic channel and the reverse link pilot channel does not change. Thus, the base station 12 effectively power controls the transmit power of the mobile station 100 on both the reverse pilot channel and the reverse traffic channel using a single PCB.

Soft Handoff in 1xEV Systems

1xEV systems use a soft handoff on the reverse link to reduce interference. In a traditional "hard" handoff, the connection to the current base station 12 is broken and a connection is made with the new base station 12 to resume communication with the mobile station 100. This is known as a "break before make" handoff. Because all base stations 12 in a CDMA system use the same frequency, it is also possible to make the connection to the new base station 12 before terminating the connection with the current base station 12. This is known as a "make before break" or "soft" handoff.

During soft handoff, each base station 12 participating in the handoff receives the signal on the reverse link from the mobile station 100. The participating base stations 12 are referred to as the active set for the mobile station 100. The mobile station transmit power is controlled by the base station 12 in the active set that is receiving the best signal on the reverse link, so that the minimum necessary power is transmitted by the mobile station 100. This is an important criterion if the maximum overall system capacity is to be achieved. Each base station 12 participating in a soft handoff makes a separate determination of the PCB to be sent to the mobile station 100. The mobile station 100 processes the PCBs from the base stations 12 in its active set separately and performs an "or of the downs" logic operation. That is, if any of the base stations 12 transmits a "down" bit or "1", the mobile station 100 reduces its transmit power. The net result is that the transmit power level of the mobile station 100 is reduced to the minimum level needed to be received by the base station 12 with the best reverse link. Thus, the soft handoff mechanism reduces interference in CDMA systems.

Soft handoff is not used in 1xEV systems on the forward link. Only one base station 12, referred to herein as the serving base station, transmits at any given time to a given mobile station 100. Because the forward traffic channel is time-multiplexed, power control is not needed and the serving base station 12 transmits at full power on the forward link. Soft handoffs on the forward link, where two or more base stations 12 transmit at full power to the same mobile station 100, would therefore increase interference. Instead, the mobile station 100 selects a base station 12 in its active set from which it receives the strongest signal as the serving base station 12 and transmits its selection on the reverse link. This process is known as sector selection.

Rate Selection Mechanism in 1xEV Systems

Figure 4:
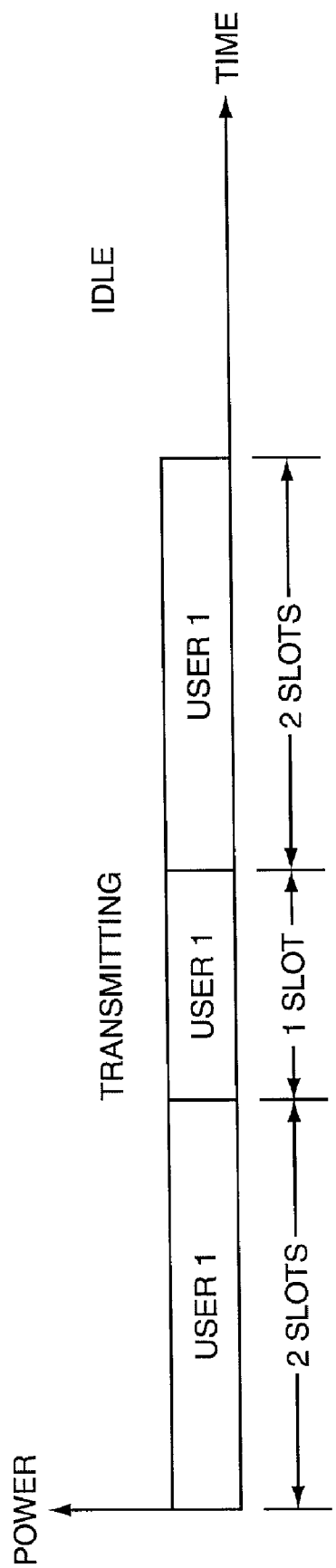
FIG. 4 is a transmission diagram illustrating transmissions from a base station.

In 1xEV systems, the forward traffic channel is a shared link over which all users may receive information. FIG. 4 is a transmission diagram illustrating transmissions on the forward traffic channel from the base station to the different mobile stations. As shown in FIG. 4, packet transmissions for different users are time multiplexed and transmitted at full power, but with data rates and slot times that vary according to channel conditions seen by the mobile stations 100 being served. The number of slots allocated to a user depends on the data rate requested by the mobile station 100.

A scheduler determines what data to transmit in a given slot according to a scheduling algorithm. One such scheduling algorithm is known as proportionally fair scheduling, which attempts to serve users having the largest ratio of desired data rate to past average data rate. The scheduling algorithm uses channel state information (CSI) received from the mobile stations 100 on the reverse link to compute a scheduling metric for each user having data to be transmitted and schedules the user that maximizes the scheduling metric. When the data queues are empty, meaning that there is no data to be transmitted, the base station 12 only transmits short pilot bursts and power control information, thereby eliminating most interference from idling sectors.

Power control of the forward traffic channel is not used. Instead, the forward traffic channel is rate-controlled. Each mobile station 100 being served measures channel conditions on the forward link and requests a data rate depending on the channel conditions that it sees. Data rates range from 38.4 kbps to 2,457.6 kbps. The modulation and encoding on the forward link is selected depending on the data rate. This process is known as link adaptation. In general, Quaternary Phase Shift Keying (QPSK) is the modulation used at the lower data rates, while either 8-PSK (8-Phase Shift Keying) or 16-QAM (16-Quadrature Amplitude Modulation) is used at the higher data rates. The base station 12 varies the modulation and encoding that maximizes throughput to the user based on the data rates requested by the users.

In order to implement link adaptation, the base station 12 needs to receive channel state information from the mobile stations 100 being served. The rate selection mechanism differs depending on the standard deployed. In general, the mobile station 100 measures the carrier-to-interference (C/I) ratio of the pilot signal received from each base station 12 in its active set and sends its signal quality measurements to the base stations 12 in its active set on the reverse link. In 1xEV-DO systems, the channel state information comprises a data rate control (DRC) symbol. The DRC symbol comprises one of sixteen possible values that map to different data rates. The mobile station 100 determines the data rate for the forward link channel based on the C/I measurements and transmits the appropriate DRC symbol to the serving sector sector. DRC information is transmitted on a channel known as the DRC channel. A similar rate control mechanism is also used in 1xEV-DV systems. The mobile stations 100 in 1xEV-DV systems transmit rate control information on a channel known as the reverse channel quality indicator channel (R-CQICH) used by the base station 12 to assign time slots and determine data rates for the forward traffic channel.

The mobile station 100 also uses the reverse link to indicate its selection of a serving base station 12 for forward link communications. As stated above, only one base station 12 transmits to a mobile station 100 at any given time. The mobile station 100 selects the base station 12 from which it receives the strongest signal as the serving base station 12 and transmits its selection on the reverse link. 1xEV-DO systems, the mobile station 100 indicates its selection by the spreading code, called the Walsh cover, applied to the DRC symbol transmitted on the DRC channel. Each base station 12 in the active set for the mobile station 100 has a unique DRC cover. Therefore, the base station 12 corresponding to the selected Walsh cover becomes the serving base station 12 on the forward link. In 1xEV-DV systems, the mobile station 100 indicates its selection of a serving base station 12 by applying the corresponding Walsh cover to the R-CQICH. The Walsh cover is 8 chips in length and covers all of the possible 6 PN offsets that a base station may use in 1xEV-DV systems for the pilots in the active set for a given mobile.

The Link Imbalance Problem

The rate selection and sector selection mechanisms used in 1xEV systems depend on the base stations 12 being able to receive and decode the rate selection and sector selection information transmitted from the mobile station 100 on the reverse link. For purposes of this application, the reverse link channel used to convey channel state, rate selection, and sector selection information to the base stations 12 in the active set is referred to herein generically as the reverse rate control channel (R-RCCH).

A mobile station 100 in soft handoff experiencing link imbalance may not be able to receive service on the forward link. A mobile station 100 is said to be experiencing link imbalance when the serving base station 12 on the forward link is different from the best reverse link base station. The best reverse link base station is the base station that receives the strongest signal from the mobile station 100. The factors causing link imbalance are numerous: different base station transmit power ratings (e.g., when deploying both macro-cells and micro-cells in the same frequency assignment), different transmission losses (e.g., arising from antenna misalignments), and different base station receiver sensitivities (e.g., different reverse link loading or different receiver noise figures). Link imbalances in excess of 3 dB are the norm, and link imbalances in excess of 6 dB are not infrequent in deployed systems.

When a mobile station 100 in soft handoff is experiencing link imbalance, the reverse link is power controlled by a base station 12 other than the serving base station 12. The base station 12 receiving the strongest signal from the mobile station 100 on the reverse link will force the mobile station 100 to reduce its transmit power on the reverse link to the minimum level needed to maintain the desired signal quality at that base station 12. If the path loss to the serving base station 12 on the reverse link is significantly higher than the path loss to the best reverse link base station 12, the mobile station 100 may reduce its transmit power to the point that the serving base station 12 is no longer able to receive and reliably decode the R-RCCH. This means that the serving base station 12 will not be able to receive data rate requests from the mobile station 100. Indeed, the serving base station 12 may not even be aware that it has been selected as the serving base station 12 if it is not able to receive the R-RCCH.

Soft Handoff Power Control Method

According to the present invention, the reverse link channel used by the mobile station 100 to transmit channel state information, data rate requests, and/or sector selection information is power controlled separately from the traffic channel. As stated earlier, this channel is referred to herein as the reverse rate control channel (R-RCCH). The R-RCCH is power controlled by the serving base station 12, while the traffic channel is power controlled by the non-serving base stations in a largely conventional manner. In some embodiments, the serving base station 12 may also participate in power controlling the reverse traffic channel.

Figure 5:
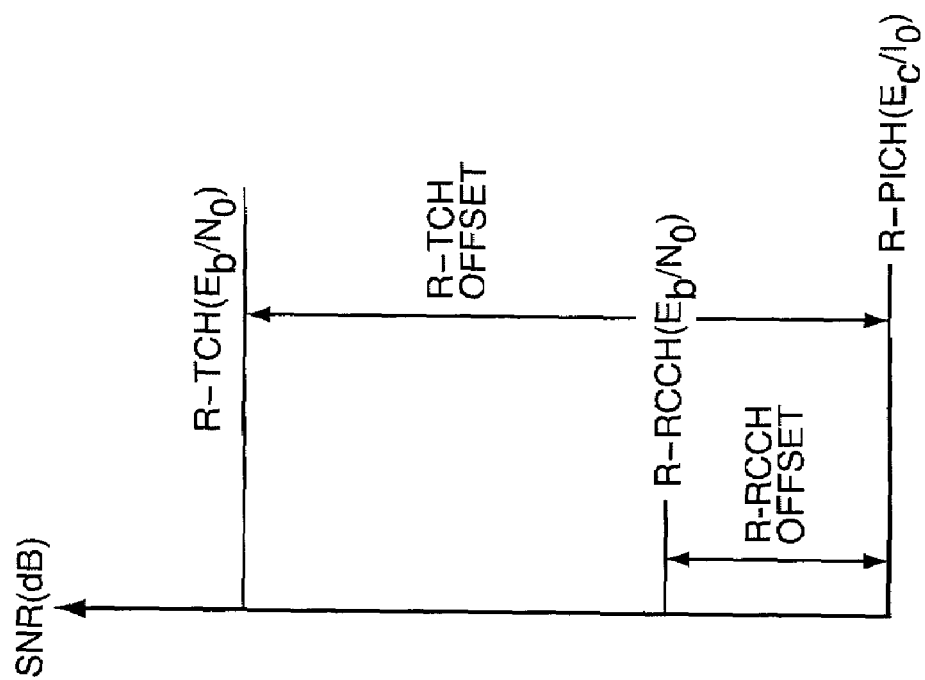
FIG. 5 is a set point diagram illustrating the relative gain of the reverse rate control and reverse traffic channel to the reverse pilot channel in a first embodiment of the invention.

In all of the embodiments described below, the base stations 12 use predetermined target SNR values, referred to herein as set points, to power control the reverse pilot, traffic, and rate control channels. FIG. 5 illustrates the set points used by the base stations 12. The set point for the reverse pilot channel is typically specified by the standard and the targeted SNR values for the reverse traffic and rate control channels are fixed relative to the reverse pilot channel. The offset between the reverse traffic and rate control channels relative to the pilot channel may be specified by the standard. The base stations 12 control the transmit power of the mobile stations 100 on the reverse link to keep the received signal strength as close as possible to the targeted set points.

Various embodiments of the present invention are disclosed, which may be categorized as explicit power control methods and implicit power control methods. Several variants of both the explicit and implicit power control methods are explained. In general, the explicit method involves dividing the forward common power control channel (F-CPCCH) into two subchannels: one to control the transmit power of the reverse traffic channel and one to control the transmit power of the reverse rate control channel. The implicit methods involve changing the way that the mobile station 100 interprets power control bits from the base stations 12 in its active set. Using this method, the mobile station 100 interprets power control bits from the serving base station 12 to power control the reverse rate control channel. The transmit power on the reverse traffic channel is controlled by the power control bits from the non-serving base stations 12 using "or of the downs" logic. One advantage of the implicit method is that it does not require additional channel resources (e.g., Walsh codes or time slots) to implement. An advantage of the explicit method is that the serving base station 12 can participate in power controlling the reverse traffic channel. Both the implicit and explicit methods are described in more detail below.

First Embodiment (Implicit Method)

Figure 6:
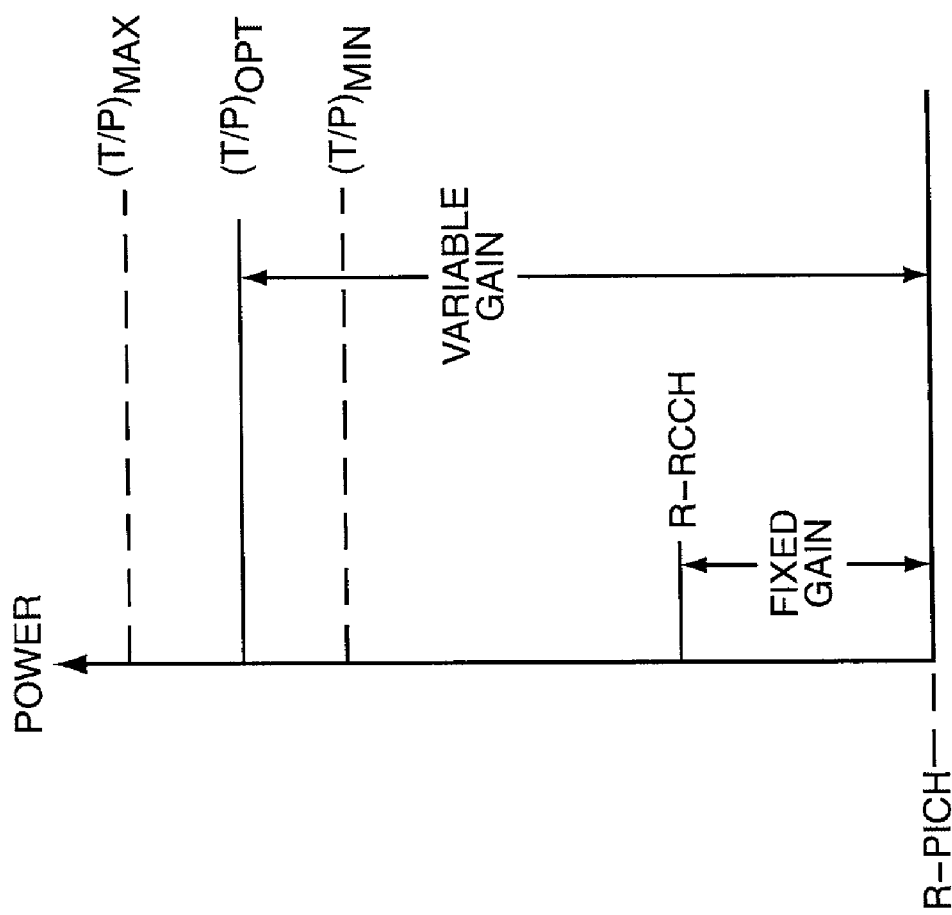
FIG. 6 is a graph illustrating the relative transmit power levels of the mobile station on the pilot, traffic, and rate control channels in a first embodiment of the invention.

FIG. 6 is a graph illustrating the transmit power level of a mobile station 100 on the reverse pilot, traffic, and rate control channels in a first embodiment of the present invention. In the embodiment shown in FIG. 6, the gain of the reverse rate control channel is fixed relative to the reverse pilot channel. The gain of the reverse traffic channel is allowed to vary relative to the reverse pilot channel power between minimum and maximum values. Thus, the reverse rate control channel has a fixed offset relative to the reverse pilot channel, while the reverse traffic channel has a variable offset. The maximum and minimum values for the reverse traffic channel offset are determined by the ratio of the reverse traffic channel power to reverse pilot channel power (the T/P ratio). The maximum traffic channel offset is determined by the maximum T/P ratio, which is referred to herein as $(T/P)_{MAX}$. The minimum offset is determined by the minimum T/P ratio, which is referred to herein as $(T/P)_{MIN}$.

In the first embodiment of the present invention, the serving base station 12 power controls the pilot channel and the reverse rate control channel, which has a fixed offset relative to the reverse pilot channel. The non-serving base stations 12 power control the reverse traffic channel. There may be more than one non-serving base station 12 in the active set for a given mobile station 100. If so, each base station 12 transmits a power control bit to the mobile station 100. The mobile station 100 processes the power control bits from the non-serving base stations 12 in a conventional manner, applying "or of the downs" logic. That is, the transmit power of the reverse traffic channel is adjusted downward if any one of the non-serving base stations 12 transmits a down bit and is adjusted upward otherwise.

Table 1 illustrates how the mobile station 100 responds to power control bits from serving and non-serving base stations.

TABLE 1

| Serving | Non-Serving | R-RCCH | R-TCH | R-PICH | T/P Change |
|---------|-------------|--------|-------|--------|------------|
| Up | Up | +Δ dB | +Δ dB | +Δ dB | 0 dB |
| Up | Down | +Δ dB[1] | −Δ dB | +Δ dB[1] | −2Δ dB |
| Down | Up | −Δ dB | +Δ dB[2] | −Δ dB | 2Δ dB |
| Down | Down | −Δ dB | −Δ dB | −Δ dB | 0 dB |

Note 1 - Provided that T/P ≧ (T/P)$_{MIN}$
Note 2 - Provided that T/P ≦ (T/P)$_{MAX}$ In the first row of Table 1, both the non-serving base stations 12 and the serving base station 12 request that the mobile station 100 increase its transmit power. In this case, the mobile station 100 increases its transmit power on the pilot, traffic, and rate control channels. There is no change in the T/P ratio. In the second row, the serving base station 12 requests that the mobile station 100 increase its power and the non-serving base stations 12 request that the mobile station 100 decrease its transmit power. In this case, the mobile station 100 decreases its transmit power on the reverse traffic channel and increases its power on the reverse pilot and rate control channels unless the adjustment would cause the T/P ratio to drop below (T/P)$_{MIN}$. This results in a two step reduction in the T/P ratio. In the third row, the serving base station 12 requests that the mobile station 100 decrease its transmit power and the non-serving base stations 12 request an increase in transmit power on the reverse traffic channel. In this case, the mobile station 100 reduces its transmit power on the reverse pilot and rate control channels and increases the transmit power on the reverse traffic channel unless the adjustment would cause the TIP ratio to exceed (T/P)$_{MAX}$. This results in a two step increase of the T/P ratio. In the last row of Table 1, the serving base station 12 requests that the mobile station 100 reduce the transmit power on the reverse pilot and rate control channels, and the non-serving base stations 12 request a reduction in power on the reverse traffic channel. In this case, the mobile station 100 reduces its transmit power on the reverse pilot, rate control, and traffic channels, with no change in the T/P ratio.

Figure 7:
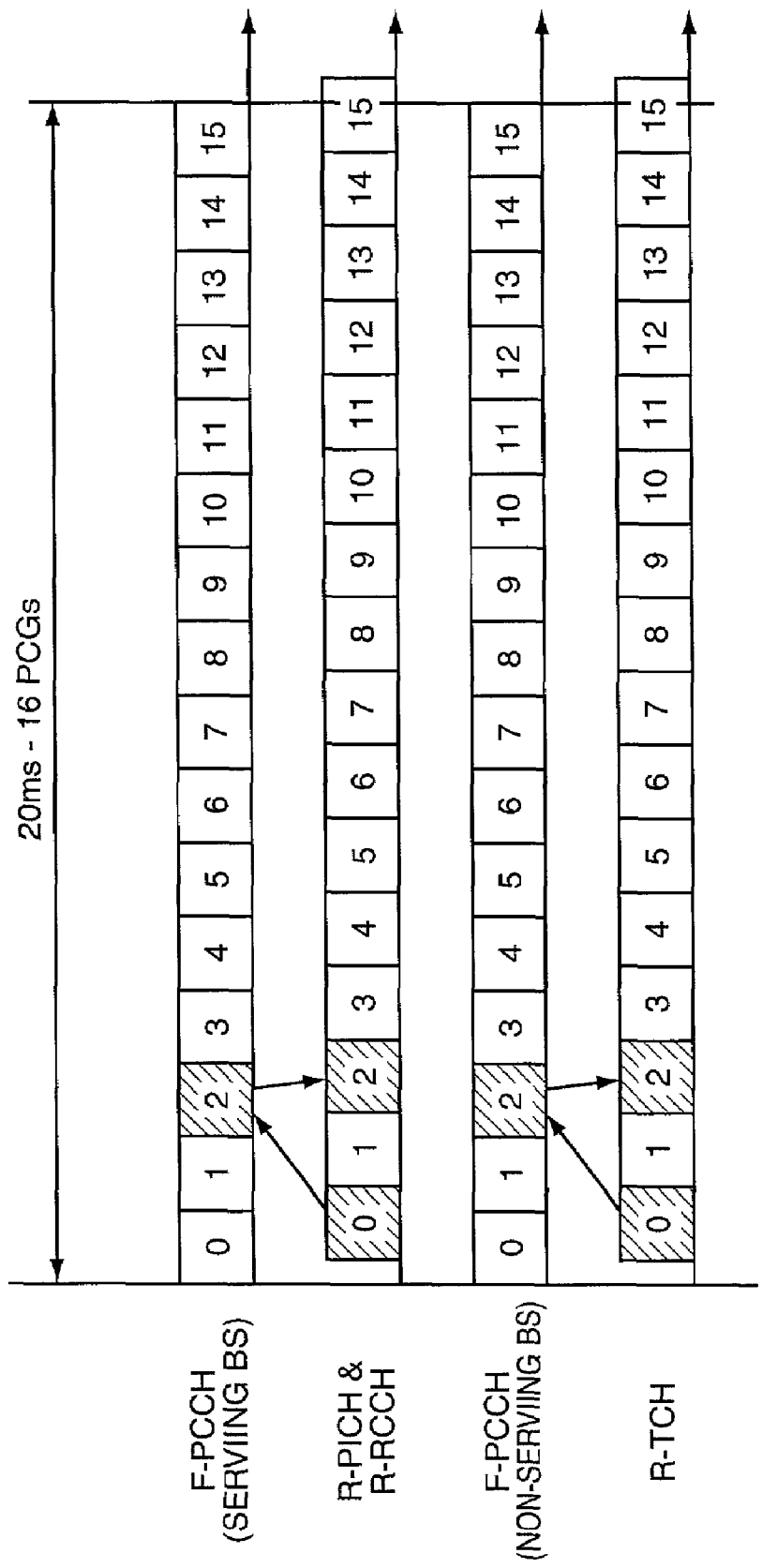
FIG. 7 is a timing diagram illustrating the power control method of the present invention.

FIG. 7 is a timing diagram illustrating the power control method of the present invention. In PCG0, the mobile station 100 transmits a data rate request and sector selection on the R-RCCH applying the Walsh cover for the selected base station 12. The rate control channel is assumed to operate at 800 symbols per second. Each base station 12 is allocated a unique Walsh cover for the rate control channel. Each base station 12 accumulates the energy over all Walsh channels that correspond to the rate control channel during each PCG. If the accumulated energy over the Walsh channel that corresponds to the base station 12 is larger than that of all other channels combined, and the accumulated energy is above a threshold value, the base station 12 determines that it is the serving base station 12.

If the base station 12 determines that it is the serving base station 12, it estimates the received pilot signal strength over one PCG and uses the estimate to determine the value of the power control bit transmitted to the mobile station 100. If the base station 12 determines that it is not a serving base station 12, or is unable to decode the rate control channel, it estimates the traffic channel signal strength over one PCG and uses the estimate to determine the value of the power control bit. For both serving and non-serving base stations 12, the PCBs are sent in the second PCG following the corresponding PCGs in which the signal strength was estimated. Thus, if the base station 12 measures the signal strength in PCG0, it transmits the corresponding power control bit in PCG2.

In PCG2, the mobile station 100 receives power control bits from the serving and non-serving base stations 12 in its active set. The mobile station 100 increases or decreases the transmit power on the reverse pilot and rate control channels responsive to the power control bit from the serving base station 12 unless the minimum T/P ratio (T/P)$_{MIN}$ is violated. The mobile station 100 adjusts its transmit power on the reverse traffic channel responsive to the PCB from the non-serving base stations 12 applying "or of the downs" logic, unless the maximum T/P ratio (T/P)$_{MAX}$ is exceeded. Therefore, if a down command is received from the serving base station 12, it is applied only to the pilot and rate control channels and not to the reverse traffic channel.

Figure 8:
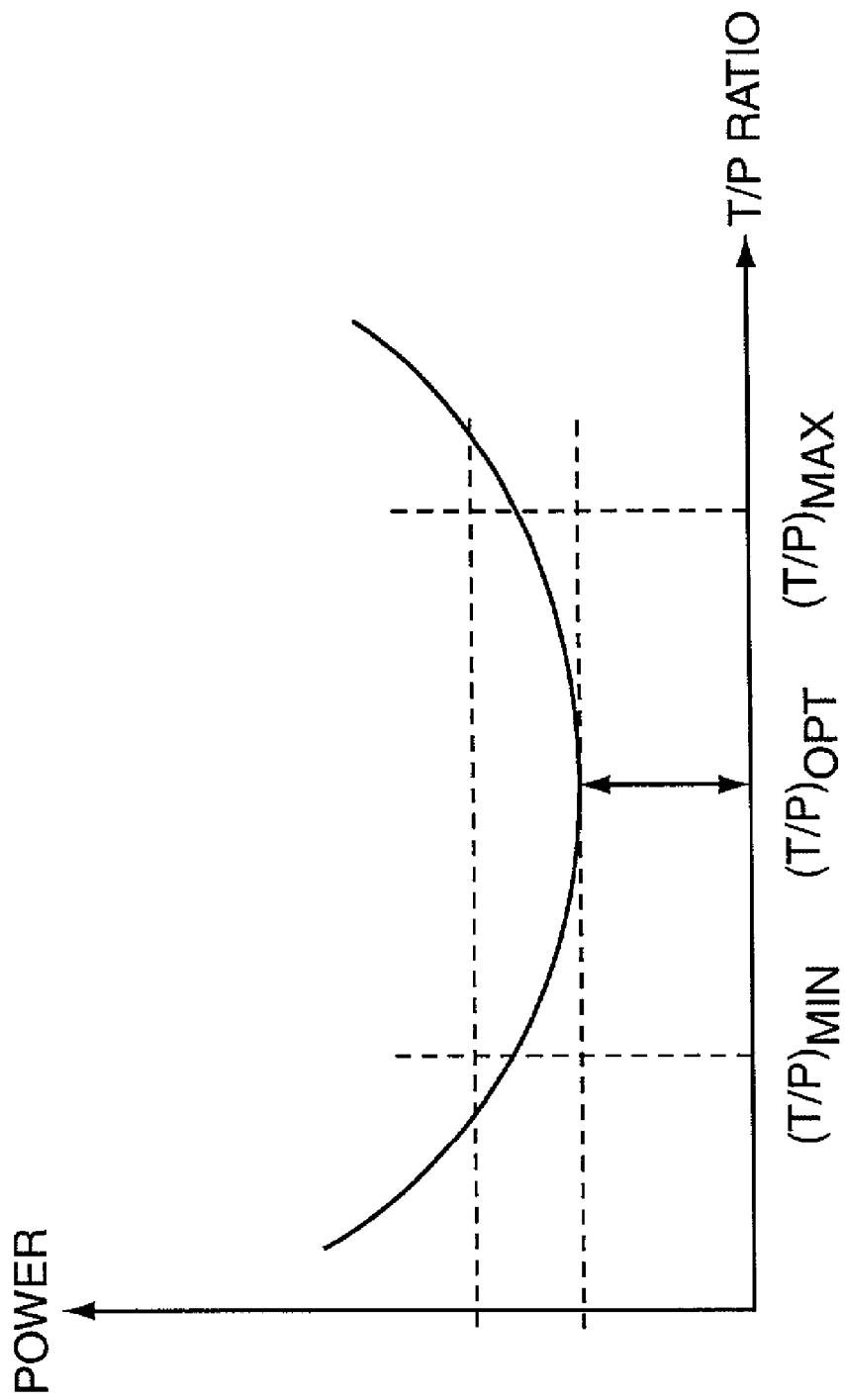
FIG. 8 is a graph of mobile station transmit power versus channel gain ratio.

The present invention allows the T/P ratio to vary between (T/P)$_{MIN}$ and (T/P)$_{MAX}$. The optimum traffic-to-pilot ratio, (T/P)$_{OPT}$, lies between these two extremes. As shown in FIG. 8, the transmit power of the mobile station 100 is minimized when the traffic-to-pilot ratio (T/P) is at (T/P)$_{OPT}$. As the T/P ratio moves away from (T/P)$_{OPT}$ in either direction, the total transmit power of the mobile station 100 on the reverse link increases and, therefore, interference within the system increases. Temporary jamming of the reverse link could occur if the T/P ratio was allowed to increase without being checked. For these reasons, the power control logic implemented in the mobile station 100 includes a mechanism to maintain the traffic-to-pilot ratio within an allowable range defined by (T/P)$_{MAX}$ and (T/P)$_{MIN}$.

When the T/P ratio reaches (T/P)$_{MAX}$, the mobile station 100 will not increase transmit power on the reverse traffic channel without a corresponding increase on the reverse pilot channel. An "up" command from the non-serving base stations 12 will not be applied unless the mobile station 100 also receives an "up" command from the serving base station 12. Thus, the transmit power on the reverse traffic channel is clipped when (T/P)$_{MAX}$ is reached. In general, this condition will typically arise when the serving base station 12 is also the best reverse link base station. In this circumstance, the serving base station 12 will request a reduction in transmit power on the reverse pilot channel, while the non-serving base stations 12 may request an increase in transmit power on the reverse traffic channel. Further, once (T/P)$_{MAX}$ is reached, the mobile station 100 applies any "down" commands from the serving base station 12 to the reverse traffic channel, as well as the reverse pilot and rate control channels. The net result is that the serving base station 12 power controls the reverse traffic channel once (T/P)$_{MAX}$ is reached.

When the T/P ratio reaches (T/P)$_{MIN}$, the transmit power on the reverse pilot and rate control channels will not be increased without a corresponding increase in the transmit power on the reverse traffic channel. The mobile station 100 will ignore an "up" command from the serving base station 12 unless it also receives an "up" command from the non-serving base stations 12. Thus, the transmit power on the pilot channel is clipped when (T/P)$_{MIN}$ is reached. If the non-serving base stations 12 command the mobile station 100 to reduce its transmit power on the reverse traffic channel, the mobile station 100 will also reduce its transmit power on the reverse pilot and rate control channels. Thus, in this situation, the reverse pilot and rate control channels are power controlled by the non-serving base stations 12.

When the mobile station is in a discontinuous transmission mode, it does not transmit on the reverse traffic channel and, therefore, the power control on the reverse traffic channel is not performed. The serving base station 12, however, will continue to power control the reverse pilot and rate control channels. In discontinuous transmission mode, the mobile station 100 cannot compute the bounding criterion $(T/P)_{MAX}$ at $(T/P)_{MIN}$. If the serving base station 12 receives the pilot signal from the mobile station 100 with low power, it will command the mobile station 100 to increase its transmit power on the reverse pilot channel. One or more of the non-serving base stations 12 may be receiving the reverse pilot channel with high power. In this situation, increasing the transmit power on the reverse pilot channel may cause excessive interference at the non-serving base stations 12 that receive the reverse pilot signal with high power. The present invention may include a mechanism to prevent the reverse pilot channel from reaching an excessive signal level at the non-serving base stations 12 when the mobile terminal is in a discontinuous transmission mode.

When a non-serving base station 12 detects that the mobile station 100 is in a discontinuous transmission mode, the non-serving base station 12 may measure the received signal strength on the reverse pilot channel and compare the received signal strength with a predetermined maximum signal strength referred to herein as $P_{MAX}$. When the received signal strength of the reverse pilot channel reaches $P_{MAX}$ at a non-serving base station 12, the non-serving base station 12 may command the mobile station 100 to decrease its transmit power level on the reverse pilot channel by transmitting a "down" bit to the mobile station 100. When the mobile station receives a "down" bit from a non-serving base station 12 while it is in a discontinuous transmission mode, the mobile station 100 applies the "down" command from the non-serving base station 12 to the reverse pilot channel. Thus, the received signal strength at any given non-serving base station 12 cannot exceed $P_{MAX}$. Pmax is (T/P)range above regular Pilot Ec/Io threshold that is used by serving base station.

If the mobile station 100 receives a "down" command from a non-serving base station 12 while it is in a discontinuous mode, the mobile station 100 decreases its transmit power on the reverse pilot channel even if the serving base station 12 commands the mobile station 100 to increase its transmit power. Thus, the "down" command from the non-serving base station 12 overrides an "up" command from the serving base station 12. Since the transmit power of the rate control channel is fixed relative to the reverse pilot channel, the serving base station 12 will also be receiving the reverse rate control channel with low power. Thus, the overriding "down" command from the non-serving base station 12 may prevent the serving base station 12 from receiving the reverse rate control channel with sufficient strength to reliably decode signals on the reverse rate control channel. However, this is necessary in order to prevent the pilot signal from jamming other base stations in case of severe link imbalance. The larger the Pmax the less frequent this will happen.

As described above, a non-serving base station 14 tests the reverse pilot channel when the mobile terminal 100 is in a discontinuous transmission mode to ensure that the received signal strength on the reverse pilot channel does not exceed $P_{MAX}$. A non-serving base station 14 may also use such testing even when the reverse traffic channel is active. A non-serving base station 14 may measure the received signal strength on both the reverse traffic channel and the reverse pilot channel and send a "down" command if either one is above the predetermined target for that channel. The mobile station 100 interprets the commands as follows. If the reverse traffic channel is active, the mobile station 100 applies the "down" command to the reverse traffic channel. If the mobile station 100 is in a discontinuous transmission mode, the mobile station 100 applies the "down" command to the reverse pilot channel.

When a handoff on the forward link occurs, the mobile station 100 applies a null cover to the R-RCCH for one PCG to indicate to the current serving base station 12 that it wants to change to a new serving base station 12. Afterwards, it applies the Walsh cover for the selected base station 12 to the R-RCCH. If the reverse pilot channel is received with excessively high power (i.e., above the set point) at the selected base station 12 when the handoff occurs, the selected base station 12 will ask the mobile station 100 to decrease its transmit power on the reverse pilot channel. The selected base station 14 may also be receiving the reverse traffic channel above the set point. If T/P ratio is at $(T/P)_{MIN}$, the mobile station 100 will apply the "down" command to the reverse pilot channel only until T/P ratio reaches $(T/P)_{MAX}$. This will cause the mobile station 100 to unnecessarily increase its transmit power on the reverse pilot channel. Once the T/P ratio reaches $(T/P)_{MAX}$, the power control commands from the selected base station 14 will be applied also to the reverse traffic channel. To avoid this potential problem, the mobile station 100 may initialize the T/P ratio to $(T/P)_{MAX}$ when a handoff on the forward link occurs by reducing the transmit power on the reverse pilot channel and maintaining the current transmit power on the reverse traffic channel. If the base station determines that R-PICH power is (T/P)range above the target it should send the "down" command regardless of the R-TCH power. If the traffic channel were not active the mobile station would apply the command to the R-PICH. The mechanism is introduced to prevent excessive R-PICH power at the non-serving base station in case of severe link imbalance when the traffic channel is not active.

Second Embodiment (Implicit Method)

Figure 9:
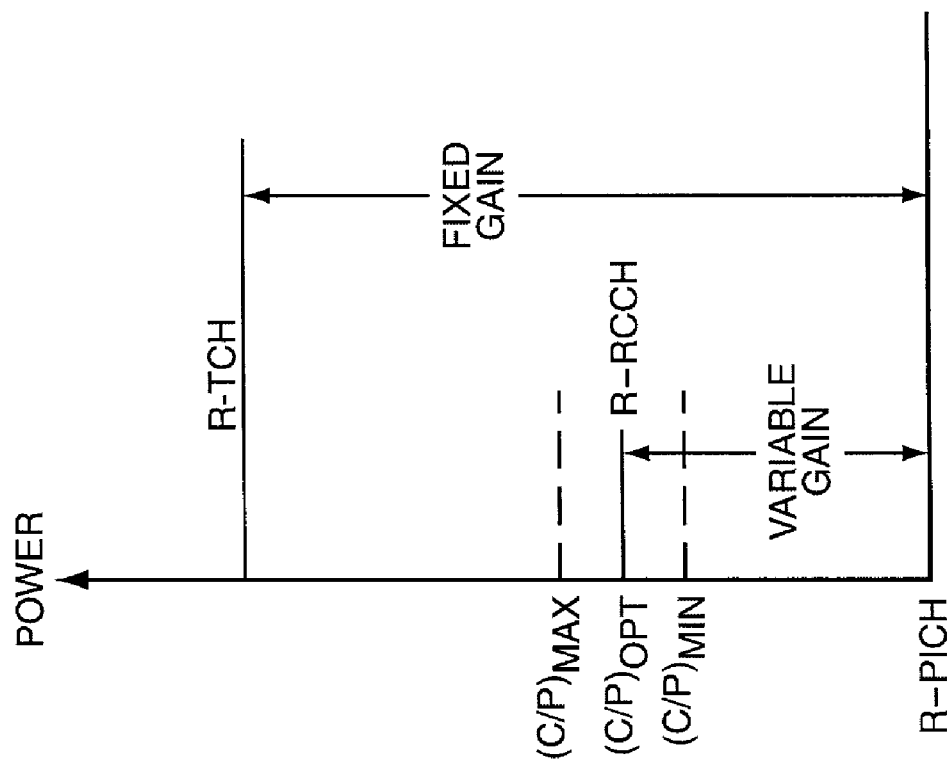
FIG. 9 is a graph illustrating the relative transmit power levels of the mobile station on the pilot, traffic, and rate control channels in a second embodiment of the invention.

FIG. 9 is a graph illustrating the transmit power level of a mobile station 100 on the reverse pilot, traffic, and rate control channels in a second embodiment of the present invention. In the second embodiment, the gain of the reverse traffic channel is fixed relative to the reverse pilot channel. The gain of the reverse rate control channel is allowed to vary relative to the reverse pilot channel power between minimum and maximum values. Thus, the reverse traffic channel has a fixed offset relative to the reverse pilot channel, while the reverse rate control channel has a variable offset. The maximum and minimum values for the reverse rate control channel offset are determined by the ratio of the reverse rate control channel power to reverse pilot channel power (the R/P ratio). The maximum traffic channel offset is determined by the maximum R/P ratio, which is referred to herein as $(R/P)_{MAX}$. The minimum offset is determined by the minimum T/P ratio, which is referred to herein as $(R/P)_{MIN}$.

In the second embodiment, the serving base station 12 controls the rate control channel transmit power. The non-serving base stations 12 control the reverse pilot power and reverse traffic channel power. The base station 12 determines whether it is the serving base station 12 as previously described. If a base station 12 determines that it is the serving base station 12, it estimates the received signal strength on the reverse rate control channel over one PCG and uses the estimate to determine the value of the power control bit transmitted to the mobile station 100. If the base station 12 determines that it is not a serving base station 12, the base station 12 estimates the received signal strength on the reverse pilot channel over one PCG and uses the estimate to determine the value of the power control bit. For both serving and non-serving base stations 12, the power control bits are sent over common power control groups. Transmission of the power control bits occurs in the second PCG following the corresponding PCG in which the signal strength was measured.

Table 2 illustrates how the mobile station 100 responds to power control bits from serving and non-serving base stations 12.

TABLE 2

| Serving | Non-Serving | R-TCH | R-RCCH | R-PICH | C/P Change |
|---------|-------------|-------|--------|--------|------------|
| Up | Up | +Δ dB | +Δ dB | +Δ dB | 0 dB |
| Up | Down | −Δ dB | +Δ dB³ | −Δ dB | 2Δ dB |
| Down | Up | +Δ dB⁴ | −Δ dB | +Δ dB⁴ | −2Δ dB |
| Down | Down | −Δ dB | −Δ dB | −Δ dB | 0 dB |

Note 3 - Provided that R/P ≦ (R/P)$_{MAX}$
Note 4 - Provided that R/P ≧ (R/P)$_{MIN}$ In the first row of Table 2, both the non-serving base stations 12 and the serving base station 12 ask the mobile station 100 to increase its transmit power. In this case, the mobile station 100 increases its transmit power on the reverse pilot, traffic, and rate control channels. There is no change in the R/P ratio. In the second row, the serving base station 12 requests that the mobile station 100 increase its transmit power, and the non-serving base stations 12 request that the mobile station 100 decrease its transmit power. In this case, the mobile station 100 increases its transmit power on the reverse rate control channel unless the adjustment would cause the R/P ratio to exceed (R/P)$_{MAX}$, and decreases its transmit power on the reverse pilot and traffic channels. There is a two step increase in the R/P ratio. In the third row, the serving base station 12 requests that the mobile station 100 decrease its transmit power, while the non-serving base stations 12 request that the mobile station 100 increase its transmit power. In this case, the mobile station 100 decreases its transmit power on the reverse rate control channel and increases its transmit power on the reverse pilot and traffic channels unless the adjustment would cause the R/P ratio to drop below (R/P)$_{MIN}$. There is a two step reduction in the R/P ratio. In the final row, both the serving base station 12 and non-serving base stations 12 both request that the mobile station 100 reduce its transmit power. In this case, the mobile station 100 decreases its transmit power on the reverse pilot, rate control, and traffic channels. There is no change in the R/P ratio.

The second embodiment allows the R/P to vary between (R/P)$_{MIN}$ and (R/P)$_{MAX}$. When the R/P ratio reaches (R/P)$_{MAX}$, the mobile station 100 will not increase transmit power on the reverse rate control channel without a corresponding increase on the reverse pilot channel. An "up" command from the serving base station 12 will not be implied unless the mobile station 100 also receives an "up" command from the non-serving base stations 12. Thus, the transmit power on the reverse rate control channel is clipped when (R/P)$_{MAX}$ is reached. Further, once (R/P)$_{MIN}$ is reached, the mobile station 100 applies any "down" commands from the serving base station 12 to the reverse pilot and traffic channels, as well as the reverse rate control channel. The net result is that the serving base station 12 power controls the reverse pilot and traffic channels once (R/P)$_{MIN}$ is reached.

When the R/P ratio reaches (R/P)$_{MIN}$, the transmit power on the reverse pilot channel will not be increased without a corresponding increase in the transmit power on the reverse rate control channel. The mobile station 100 will ignore an "up" command from the non-serving base stations 12 unless it also receives an "up" command from the serving base station 12. Thus, the transmit power on the reverse pilot channel is clipped when (R/P)$_{MIN}$ is reached. If the serving base stations 12 command the mobile station 100 to reduce its transmit power on the reverse rate control channel, the mobile station 100 will also reduce its transmit power on the reverse pilot and traffic channels. In this situation, the reverse pilot and traffic channels are power controlled by the serving base station 12.

The second embodiment also includes a mechanism to initialize the R/P ratio after a handoff on the forward link. If the reverse rate control channel is received with high power at the selected base station 12 when the handoff occurs, the selected base station 12 will ask the mobile station 100 to decrease its transmit power. The selected base station 14 may also be receiving the reverse pilot channel above the set point. If the R/P ratio is at (R/P)$_{MAX}$ the mobile station will apply the "down" command to the reverse rate control channel only until the R/P ratio reaches (R/P)$_{MIN}$. This will cause the mobile station 100 to unnecessarily increase its transmit power on the reverse pilot channel. To avoid this potential problem, the mobile station 100 may initialize the R/P ratio to (R/P)$_{MIN}$ when a handoff on the forward link occurs by reducing the transmit power on the reverse rate control channel and maintaining the current transmit power on the reverse pilot channel.

Third Embodiment (Implicit Method)

Figure 10:
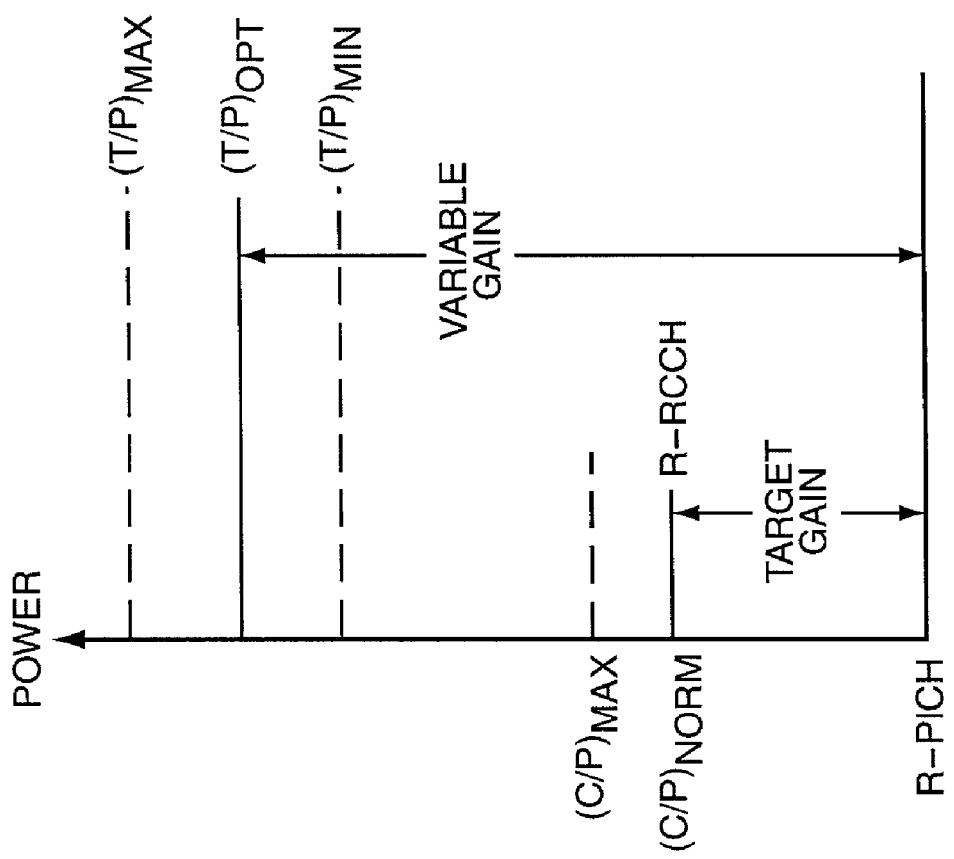
FIG. 10 is a graph illustrating the relative transmit power levels of the mobile station on the pilot, traffic, and rate control channels in a third embodiment of the invention.

FIG. 10 is a graph illustrating the transmit power level of a mobile station 100 on the reverse pilot, traffic, and rate control channels in a third embodiment of the present invention. In the third embodiment, the gain of the reverse traffic channel is allowed to vary relative to the reverse pilot channel power between minimum (T/P)$_{MIN}$ and maximum (T/P)$_{MAX}$ values. The gain the reverse rate control channel is fixed relative to the reverse pilot channel as long as the gain ratio between the reverse traffic channel power and the reverse pilot channel power is above (T/P)$_{MIN}$. Thus, the reverse rate control channel has a target offset relative to the reverse pilot channel which is nominally fixed, while the reverse traffic channel has a variable offset. When (T/P)$_{MIN}$ is reached, the gain of the reverse rate control channel may be varied relative to the reverse pilot channel between a minimum value (R/P)$_{MIN}$ and a maximum value (R/P)$_{MAX}$. The targeted offset for the reverse rate control channel relative to the reverse pilot channel is referred to herein as (R/P)$_{NORM}$. In one embodiment (R/P)$_{NORM}$ may be equal to (R/P)$_{MIN}$.

In the third embodiment of the present invention, the serving base station 12 controls the reverse pilot channel transmit power and the reverse rate control channel power, which has a fixed offset relative to the reverse pilot channel, as long as the T/P ratio is above (T/P)$_{MIN}$. The non-serving base stations 12 control the transmit power of the mobile station 100 on the reverse traffic channel. The base station 12 determines whether it is the serving base station 12 as previously described. If a base station 12 determines that it is the serving base station 12, it estimates the received signal strength on the reverse pilot channel over one PCG and uses the estimate to determine the value of the power control bit transmitted to the mobile station 100. If the base station 12 determines that it is not a serving base station 12, the base station 12 estimates the received signal strength on the reverse traffic channel over one PCG and uses the estimate to determine the value of the power control bit. For both serving and non-serving base stations 12, the power control bits are sent over common power control groups. Transmission of the power control bits occurs in the second PCG following the corresponding PCG in which the signal strength was measured.

Table 3 illustrates how the mobile station 100 responds to power control bits from serving and non-serving base stations 12.

TABLE 3

| Serving | Non-Serving | R-TCH | R-PICH | R-RCCH | T/P Change |
|---------|-------------|-------|--------|--------|------------|
| Up | Up | +Δ dB | +Δ dB | 0 dB | 0 dB |
| Up | Down | −Δ dB | +ΔDb[5] | Δ dB[6] | −2Δ dB |
| Down | Up | +Δ dB[7] | −Δ dB[8] | −Δ dB[9] | 2Δ dB |
| Down | Down | −Δ dB | −Δ dB[10] | −Δ dB[11] | 0 dB |

Note 5 - Provided T/P ≧ (T/P)$_{MIN}$ and R/P = (R/P)$_{NORM}$
Note 6 - Decrease independently of R-PICH if T/P > (T/P)$_{NORM}$ provided that R/P ≦ (R/P)$_{MAX}$
Note 7 - Provided T/P ≦ (T/P)$_{MAX}$
Note 8 - Provided that R/P = (R/P)$_{NORM}$
Note 9 - Decrease independently of R-PICH if R/P > (R/P)$_{NORM}$
Note 10 - Provided that R/P = (R/P)$_{NORM}$
Note 11 - Decrease independently of R-PICH if R/P > (R/P)$_{NORM}$ In the first row of Table 3, both the non-serving base stations 12 and the serving base station 12 ask the mobile station 100 to increase its transmit power. In this case, the mobile station 100 increases its transmit power on the reverse pilot, traffic, and rate control channels. There is no change in the T/P ratio. In the second row, the serving base station 12 requests that the mobile station 100 increase its transmit power and the non-serving base stations 12 request that the mobile station 100 decrease its transmit power. In this case, the mobile station 100 decreases its transmit power on the reverse traffic channel and increases its power on the reverse pilot and rate control channels as long as the adjustment does not cause the T/P ratio to drop below (T/P)$_{MIN}$. This results in a two step reduction in the T/P ratio. If the T/P ratio has already reached (T/P)$_{MIN}$, the mobile station 100 may apply the "up" command from the serving base station 12 only to the reverse rate control channel, but not the reverse pilot channel, unless increasing the transmit power on the reverse rate control channel would cause the R/P ratio to exceed (R/P)$_{MAX}$. In the third row, the serving base station 12 requests that the mobile station 100 decrease its transmit power and the non-serving base stations 12 request an increase in transmit power on the reverse traffic channel. In this case, the mobile station 100 reduces the transmit power on the reverse pilot channel and rate control channels provided that the R/P ratio is equal to (R/P)$_{NORM}$. If the R/P ratio is greater than (R/P)$_{NORM}$, the mobile station 100 reduces its transmit power on the reverse rate control channel and leaves the transmit power on the reverse pilot channel unchanged to move the R/P ratio closer to (R/P)$_{NORM}$. The mobile station 100 also increases its transmit power on the reverse traffic channel unless the T/P ratio exceeds (T/P)$_{MAX}$. This results in a two step increase of the T/P ratio if both the reverse traffic and reverse pilot channels are adjusted. In the last row of Table 3, the serving base station 12 requests that the mobile station 100 reduce the transmit power on the reverse pilot and rate control channels, and the non-serving base stations 12 request a reduction in power on the reverse traffic channel. In this case, the mobile station 100 reduces its transmit power on the reverse pilot, rate control, and traffic channels with no change in the T/P ratio, if the R/P ratio is equal to (R/P)$_{NORM}$. If the R/P ratio is greater than (R/P)$_{NORM}$, the mobile station 100 reduces its transmit power on the reverse traffic and reverse rate control channels and leaves the reverse pilot channel unchanged to move the R/P ratio closer to (R/P)$_{NORM}$.

Like the first embodiment, the third embodiment of the power control method allows the T/P ratio to vary between (T/P)$_{MIN}$ and (T/P)$_{MAX}$. Therefore, the third embodiment includes the same mechanism used in the first embodiment to maintain the T/P ratio within the allowable range defined by (T/P)$_{MAX}$ and (T/P)$_{MIN}$. When the T/P ratio reaches (T/P)$_{MAX}$, the mobile station 100 will not increase transmit power on the reverse traffic channel without a corresponding increase on the reverse pilot channel. An "up" command from the non-serving base stations 12 will not be applied unless the mobile station 100 also receives an "up" command from the serving base station 12. Thus, the transmit power on the reverse traffic channel is clipped when (T/P)$_{MAX}$ is reached. Further, once (T/P)$_{MAX}$ is reached, the mobile station 100 applies any "down" commands from the serving base station 12 to the reverse traffic channel, as well as the reverse pilot and rate control channels. The net result is that the serving base station 12 power controls the reverse traffic channel once (T/P)$_{MAX}$ is reached.

When the T/P ratio reaches (T/P)$_{MIN}$, the transmit power on the reverse pilot and rate control channels will not be increased without a corresponding increase in the transmit power on the reverse traffic channel. That is, the mobile station 100 will ignore an "up" command from the serving base station 12 unless it also receives an "up" command from the non-serving base stations 12. Thus, the transmit power on the reverse pilot channel is clipped when (T/P)$_{MIN}$ is reached. If the non-serving base stations 12 command the mobile station 100 to reduce its transmit power on the reverse traffic channel, the mobile station 100 will also reduce its transmit power on the pilot and rate control channels. Thus, in this situation, the reverse pilot and rate control channels are power controlled by the non-serving base stations 12.

Additionally, the third embodiment allows the R/P ratio to deviate from an optimal value, referred to herein as (R/P)$_{NORM}$, when the T/P ratio reaches (T/P)$_{MIN}$. When (T/P)$_{MIN}$ is reached, the mobile station 100 cannot increase its transmit power on the reverse pilot channel. In this circumstance, the mobile station 100 may apply the "up" command from the serving base station 12 to the reverse rate control channel only, which will cause the R/P ratio to deviate from the normal value (R/P)$_{NORM}$. Once the R/P ratio deviates from (R/P)$_{NORM}$, the mobile station 100 will apply "down" commands from the serving base station 12 to the reverse rate control channel, but not the reverse pilot channel, until the R/P ratio again reaches its normal value When the mobile station 100 executes a handoff on the forward link, the mobile station 100 may use an initialization scheme similar to the one used in the first embodiment. That is, the mobile station 100 may initialize the T/P ratio to (T/P)$_{MAX}$ when a handoff on the forward link occurs by reducing the transmit power on the reverse pilot channel and maintaining the current transmit power on the reverse traffic channel. Additionally, the mobile station 100 may set the gain for the reverse rate control equal to (R/P)$_{NORM}$ by decreasing the transmit power on the rate control channel if necessary.

Fourth Embodiment (Implicit Method)

Figure 11:
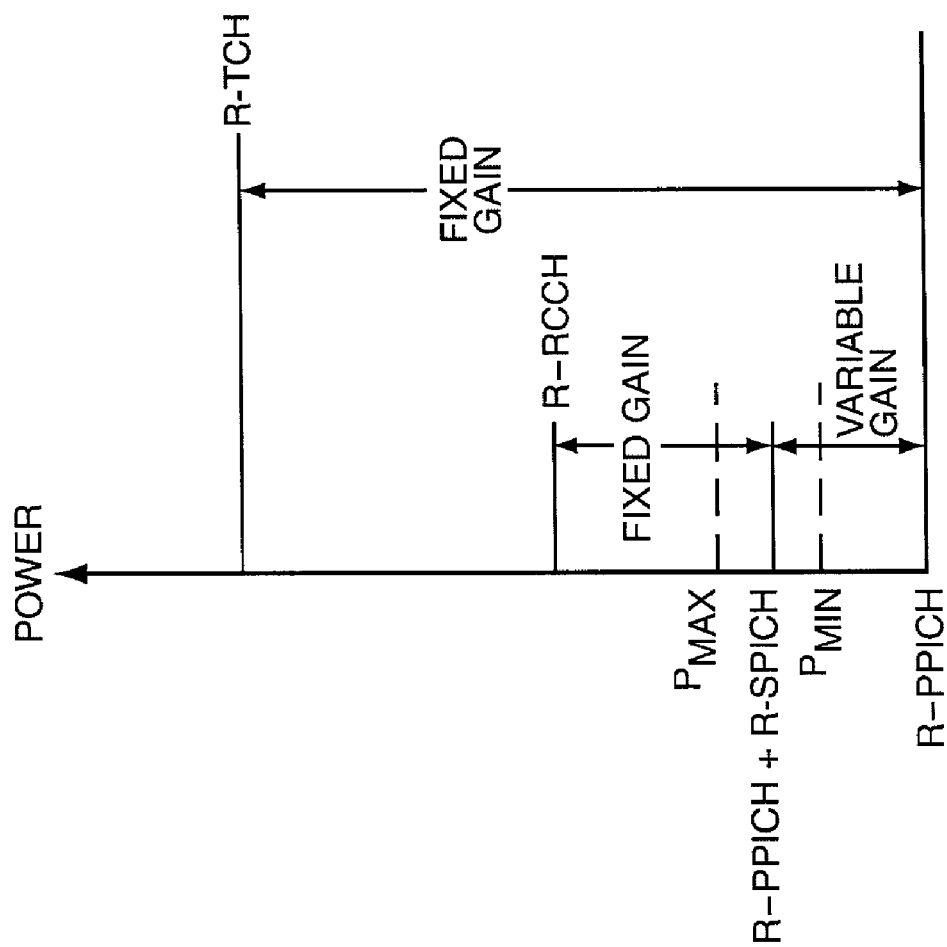
FIG. 11 is a graph illustrating the transmit power level of a mobile station on the reverse pilot, traffic, and rate control channels in a fourth embodiment of the invention.

FIG. 11 is a graph illustrating the transmit power level of a mobile station 100 on the reverse pilot, traffic, and rate control channels in a fourth embodiment of the present invention. In the fourth embodiment, the mobile station 100 transmits two pilot signals: a primary pilot signal and a secondary pilot signal. The primary and secondary pilot signals are transmitted on distinct Walsh channels referred to herein as the reverse primary pilot channel (R-PPICH) and the reverse secondary pilot channel (R-SPICH) channel. The gain of the reverse traffic channel is fixed relative to R-PPICH. The gain of the R-SPICH varies relative to R-PPICH between minimum value $P_{MIN}$ and maximum value $P_{MAX}$. The gain of the rate control channel is fixed relative to the sum of the R-PPICH and R-SPICH. The total transmit power of the mobile station 100 on both the R-PPICH and R-SPICH is referred to herein as the total pilot power $P_T$.

In the fourth embodiment of the present invention, the non-serving base stations 12 control the transmit power $P_P$ of the mobile station 100 on the R-PPICH and reverse traffic channel, and the serving base station 12 controls the total reverse pilot power $P_T$ and the reverse rate control channel power. The base station 12 determines whether it is the serving base station 12 as previously described. If a base station 12 determines that it is the serving base station 12, it estimates the received signal strength on both reverse pilot channels over one PCG and uses the estimate to determine the value of the power control bit transmitted to the mobile station 100. If the base station 12 determines that it is not a serving base station 12, the base station 12 estimates the received signal strength on the reverse primary pilot channel over one PCG and uses the estimate to determine the value of the power control bit. For both serving and non-serving base stations 12, the power control bits are sent over common power control groups. Transmission of the power control bits occurs in the second PCG following the corresponding PCG in which the signal strength was measured.

Table 4 illustrates how the mobile station 100 responds to power control bits from serving and non-serving base stations 12.

TABLE 4

| Serving | Non-Serving | R-PPICH | R-PPICH + R-SPICH | R-TCH | R-RCCH |
| --- | --- | --- | --- | --- | --- |
| Up | Up | +Δ dB | +Δ dB | +Δ dB | +Δ dB |
| Up | Down | −Δ dB | +Δ dB$_{12}$ | −Δ dB | +Δ dB$_{12}$ |
| Down | Up | +Δ dB$_{13}$ | −Δ dB | +Δ dB$_{13}$ | −Δ dB |
| Down | Down | −Δ dB | −Δ dB | −Δ dB | −Δ dB |

Note 12 - Provided that $P_T/P_P \leq (P_T/P_P)_{MAX}$
Note 13 - Provided that $P_T/P_P \geq (P_T/P_P)_{MIN}$ In the first row of Table 4, both the non-serving base stations 12 and the serving base station 12 ask the mobile station 100 to increase its transmit power. In this case, the mobile station 100 increases its total transmit power on primary pilot, traffic, and rate control channels. the mobile station 100 also increases its total reverse pilot power. In the second row, the serving base station 12 requests that the mobile station 100 increase its power and the non-serving base stations 12 request that the mobile station 100 decrease its transmit power. In this case, the mobile station 100 decreases its transmit power on the reverse primary pilot channel and the reverse traffic channel, and increases its total reverse pilot power and reverse rate control channel power as long as the $P_T/P_P$ ratio does not exceed $(P_T/P_P)_{MAX}$. In the third row, the serving base station 12 requests that the mobile station 100 decrease its transmit power and the non-serving base stations 12 request an increase in transmit power. In this case, the mobile station 100 increases its transmit power on the reverse primary pilot and reverse traffic channels as long as the adjustment does not cause the $P_T/P_P$ ratio to drop below $(P_T/P_P)_{MIN}$, and reduces its total reverse pilot power rate control channel power. In the last row of Table 3, the serving and non-serving base stations 12 request that the mobile station 100 reduce its transmit power. In this case, the mobile station 100 reduces its transmit power on the reverse primary pilot, reverse rate control, and reverse traffic channels. Additionally, the mobile station 100 reduces the total reverse pilot power.

The fourth embodiment of the power control method allows the $P_T/P_P$ ratio to vary between $(P_T/P_P)_{MIN}$ and $(P_T/P_P)_{MAX}$. Therefore, the fourth embodiment includes a mechanism to maintain the $P_T/P_P$ ratio within the allowable range defined by $(P_T/P_P)_{MAX}$ and $(P_T/P_P)_{MIN}$. When the $P_T/P_P$ ratio reaches $(P_T/P_P)_{MAX}$, the mobile station 100 will not increase total pilot power $P_T$ without a corresponding increase on the reverse primary pilot channel power. An "up" command from the serving base stations 12 will not be applied unless the mobile station 100 also receives an "up" command from the non-serving base stations 12. Thus, the total pilot power is clipped when $(P_T/P_P)_{MAX}$ is reached. Further, once $(P_T/P_P)_{MAX}$ is reached, the mobile station 100 reduces the total reverse pilot power responsive to any "down" commands from the non-serving base stations 12. The net result is that the non-serving base stations 12 control the total reverse pilot power and rate control channel power once $(P_T/P_P)_{MAX}$ is reached. When the $P_T/P_P$ ratio reaches $(P_T/P_P)_{MIN}$, the transmit power on the reverse primary pilot channel will not be increased without a corresponding increase in the total pilot power. The mobile station 100 will ignore an "up" command from the non-serving base stations 12 unless it also receives an "up" command from the serving base station 12. Thus, the transmit power on the primary pilot channel is clipped when $(P_T/P_P)_{MIN}$ is reached. If the serving base station 12 commands the mobile station 100 to reduce its total pilot power, the mobile station 100 will also reduce its transmit power on the $(P_T/P_P)_{MIN}$ primary pilot channel to maintain $P_T/P_P$ above $(P_T/P_P)_{MIN}$. Thus, in this situation, the reverse primary pilot channel and reverse traffic channel are power controlled by the non-serving base stations 12. Typically, but not necessarily $(P_T/P_P)_{MIN}$ is equal to 1. When switching between two base stations $P_T/P_P$ is initialized at $(P_T/P_P)_{MIN}$ by maintaining the $P_P$ and reducing $P_T$ power.

Fifth Embodiment (Explicit Methods)

Each of the embodiments thus far described has involved the implicit method of power control. In the implicit methods, the mobile station 100 discriminates between serving and non-serving base stations when interpreting power control commands. In the explicit methods described below, the forward common power control channel (F-CPCCH) is sub-divided into two subchannels, which may for example comprise two distinct time slots on the power control channel. The power control subchannels are referred to herein as the primary power control subchannel (F-PPCCH) and the secondary power control subchannel (F-SPCCH). A base station 12 in the active set for a given mobile station 100 uses the secondary power control subchannel (F-SPCCH) only if it is the serving base station 12. Thus, the serving base station 12 may send two power control bits— one on the F-PPCCH and optionally one on the F-SPCCH. The non-serving base stations 12 send only one power control bit on the F-PPCH. The explicit method could apply the same bounding criterion used in the implicit methods to maintain the channel gain ratios within desired ranges.

Using the explicit method, the power control bit received from the serving base station 12 controls the mobile station transmit power on one channel, while the power control bits received on the F-PPCCH controls the mobile station transmit power on a different channel. It will be readily apparent to one skilled in the art how the first, second, third and fourth embodiments described above may be implemented using explicit power control. The only difference is that the serving base station 12 participates in voting along with the non-serving base stations on one of the channels and power controls the other channel exclusively. For example, using explicit power control to implement the first method, the serving base station 12 would send two power control bits per PCG—one on the F-PPCCH and one on the F-SPCCH. The non-serving base stations 12 would send one power control bit per PCG on the F-PPCCH. The mobile station 100 interprets the power control bits received on the F-PPCCH using "or of the downs" voting. If the voting results in an "up" command, the mobile station 100 increase its transmit power on the reverse traffic channel. If the voting results in a "down" command, the mobile station 100 decreases its transmit power on the reverse traffic channel. If the serving base station 12 is the best reverse link sector, its "down" vote would cause the mobile station 100 to reduce its transmit power the same as any non-serving base station 12. This would not happen using the implicit method.

Table 5 below illustrates a variant of the first method implemented using explicit power control. Note that in Table 5, an "up" command from the non-serving base stations 12 indicates that all the non-serving base stations 12 are sending an "up" command, while a "down" command from the non-serving base stations 12 means that at least one of the non-serving base stations 12 is sending a down command. The base station 12 determines whether it is the serving base station 12 as previously described. If a base station 12 determines that it is the serving base station 12, it estimates the received signal strength on the reverse pilot channel over one PCG and, if so, compares the received signal strength to a predetermined threshold, which represents the maximum signal strength allowable on the reverse pilot channel. If the received signal strength on the reverse pilot channel exceeds the threshold, the serving base station 12 sends a "down" command on the F-SPCCH. Additionally, the base station 12 measures the received signal strength on the reverse traffic channel and sends a power control bit on the F-PPCCH depending on the measurement. Thus, the serving base station 12 may send either one or two power control bits depending on whether the received pilot power is greater than the threshold. If the base station 12 determines that it is not a serving base station 12, the base station 12 estimates the received signal strength on the reverse traffic channel over one PCG and uses the estimate to determine the value of the power control bit.

TABLE 5

| F-PPCCH (SERVING) | F-PPCCH (NON-SERVING) | F-SPCCH (SERVING) | R-PICH | R-TCH | R-RCCH |
|---|---|---|---|---|---|
| Up | Up | Down | −Δ dB | +Δ dB | −Δ dB |
| Up | Down | Down | Δ Db | −Δ dB | Δ dB |
| Up | Up | DTX | +Δ dB | +Δ dB | +Δ dB |
| Up | Down | DTX | +Δ dB14 | −Δ dB | +Δ dB16 |
| Down | Up | DTX | −Δ Db | −Δ Db | −Δ Db |
| Down | Down | DTX | −Δ Db | −Δ Db | −Δ Db |

Note 14 - Provided that T/P $\leq$ (T/P)$_{MIN}$

In the first row of Table 5, the serving and non-serving base stations 12 send an "up" command on the F-PPCCH and the serving base station 12 sends a "down" command on the F-SPCCH. In this case, the mobile station 100 decreases its transmit power on the reverse pilot and rate control channels, and increases its transmit power on the reverse traffic channel. There is a two step change in the T/P ratio. In the second row, the serving base station 12 sends an "up" command on the F-PPCCH and a "down" command on the F-SPCCH. The non-serving base stations 12 send a "down" command on the F-PPCCH. In this case, the mobile station 12 decreases its transmit power on the reverse pilot, rate control, and traffic channels. There is no change in the T/P ratio.

In rows three through five of Table 5, the serving base station 12 sends only a single bit on the F-PPCCH, which is applied by the mobile station 100 to the reverse pilot and rate control channels in the same manner as the first embodiment. In row three, both the non-serving base stations 12 and the serving base station 12 request that the mobile station 100 increase its transmit power. In this case, the mobile station 100 increases its transmit power on the pilot, traffic, and rate control channels. There is no change in the T/P ratio. In the fourth row, the serving base station 12 requests that the mobile station 100 increase its transmit power and the non-serving base stations 12 request that the mobile station 100 decrease its transmit power. In this case, the mobile station 100 decreases its transmit power on the traffic channel and increases its transmit power on the pilot and rate control channels unless the minimum T/P ratio (T/P)$_{MIN}$ is violated. This results in a two step reduction in the T/P ratio. In the fifth row, the serving base station 12 requests that the mobile station 100 decrease its transmit power and the non-serving base stations 12 request an increase in transmit power on the traffic channel. In this case, the mobile station 100 reduces the transmit power on the pilot and rate control channels and increases the transmit power on the traffic channel. This results in a two step increase of the T/P ratio. In the last row of Table 5, the serving base station 12 requests that the mobile station 100 reduce the transmit power on the pilot and rate control channels, and the non-serving base stations 12 request a reduction in power on the traffic channel. In this case, the mobile station 100 reduces its transmit power on the pilot, rate control, and traffic channels, with no change in the T/P ratio.

When the T/P ratio reaches $(T/P)_{MIN}$, the transmit power on the reverse pilot and rate control channels will not be increased without a corresponding increase in the transmit power on the reverse traffic channel. This mechanism is used to protect the non-serving base stations 12 from excessive pilot power. The consequence is that the serving base station 12 may not receive the R-RCCH with sufficient power. (T/P)min is set to optimize the trade-off between jamming non-serving base stations 12 and reliable decoding of R-RCCH at the serving one. That is, the mobile station 100 will ignore an "up" command from the serving base station 12 unless it also receives an "up" command from the non-serving base stations 12. Thus, the transmit power on the reverse pilot channel is clipped when $(T/P)_{MIN}$ is reached. If the non-serving base stations 12 command the mobile station 100 to reduce its transmit power on the reverse traffic channel, the mobile station 100 will also reduce its transmit power on the pilot and rate control channels. Thus, in this situation, the reverse pilot and rate control channels are power controlled by the non-serving base stations 12.

What is claimed is:

1. A method of controlling the transmit power of a mobile station in a mobile communication system, comprising:
   varying a first transmit power level of the mobile station on a first reverse link channel responsive to power control commands from a serving base station, while conditionally ignoring power control commands from any non-serving base stations for purposes of power controlling the first reverse link channel; and
   varying a second transmit power level of the mobile station on a second reverse link channel responsive to power control commands from at least one non-serving base station.

2. The method of claim 1 wherein the first reverse link channel is a reverse rate control channel and the second reverse link channel is a reverse traffic channel.

3. The method of claim 2 wherein the gain of the reverse rate control channel is fixed relative to a reverse pilot channel and wherein the transmit power level of the mobile station on the reverse pilot channel is varied responsive to the power control commands from the serving base station.

4. The method of claim 2 wherein the gain of the reverse traffic channel is fixed relative to a reverse pilot channel and wherein the transmit power level of the mobile station on the reverse pilot channel is varied responsive to the power control commands from the at least one non-serving base station.

5. The method of claim 1 wherein varying a second transmit power level of the mobile station on a second reverse link channel responsive to power control commands from at least one non-serving base station comprises:
   receiving power control commands from one or more non-serving base stations; and
   decreasing the second transmit power level if at least one of the non-serving base stations commands the mobile station to decrease its power level.

6. The method of claim 5 wherein varying a second transmit power level of the mobile station on a second reverse link channel responsive to power control commands from at least one non-serving base station further comprises increasing the second transmit power level if all of the non-serving base stations command the mobile station to increase its power level.

7. The method of claim 5 further comprising varying a second transmit power level of the mobile station on a second reverse link channel responsive to power control commands from the serving base station.

8. The method of claim 7 wherein varying a second transmit power level of the mobile station on a second reverse link channel responsive to power control commands from the serving base station comprises decreasing the transmit power level of the mobile station if the serving base station commands the mobile station to decrease its transmit power.

9. The method of claim 8 wherein varying a second transmit power level of the mobile station on a second reverse link channel responsive to power control commands from the serving base station further comprises increasing the transmit power of the mobile station on the second reverse link channel if the serving base station and each non-serving base station commands the mobile station to increase its transmit power.

10. The method of claim 1 further comprising computing a first channel gain of one of the first and second reverse link channels relative to a third reverse link channel.

11. The method of claim 10 wherein varying a first transmit power level of the mobile station on a first reverse link channel responsive to power control commands from a serving base station, while conditionally ignoring power control commands from any non-serving base stations for purposes of power controlling the first reverse link channel comprises:
   ignoring the power control commands from any non-serving base stations if the first channel gain meets a predetermined criterion; and
   considering power control commands from one or more of the non-serving base stations for purposes of power controlling the first reverse link channel if the first channel gain does not meet the predetermined criterion.

12. The method of claim 11 further comprising varying the first transmit power level of the mobile station on the first reverse link channel responsive to power control commands from at least one non-serving base station if the first channel gain does not meet the predetermined criterion.

13. The method of claim 10 wherein varying a second transmit power level of the mobile station on a second reverse link channel responsive to power control commands from at least one non-serving base station comprises:
   determining if the first channel gain meets a predetermined criterion; and
   varying the transmit power level of the mobile station on the second reverse link channel if the first channel gain meets the predetermined criterion.

14. The method of claim 13 further comprising varying the second transmit power level of the mobile station on the second reverse link channel responsive to power control commands from the serving base station if the first channel gain does not meet the predetermined criterion.

15. The method of claim 10 further comprising computing a second channel gain of one of the first and second reverse link channels relative to the third reverse link channel.

16. The method of claim 15 wherein varying a first transmit power level of the mobile station on a first reverse link channel responsive to power control commands from a serving base station, while conditionally ignoring power control commands from any non-serving base stations for purposes of power controlling the first reverse link channel comprises:

ignoring the power control commands from any non-serving base stations if the first channel gain meets a first predetermined criterion;

ignoring the power control commands from any non-serving base stations if the second channel gain meets a second predetermined criterion; and considering power control commands from one or more of the non-serving base stations for purposes of power controlling the first reverse link channel if either of the first and second channel gains does not meet the first and second predetermined criterion respectively.

17. The method of claim 16 further comprising varying the first transmit power level of the mobile station on the first reverse link channel responsive to power control commands from at least one non-serving base station if the first channel gain does not meet the first predetermined criterion.

18. The method of claim 1 further comprising varying a first transmit power level of the mobile station on the first reverse link channel responsive to power control commands from at least one non-serving base station if the mobile station is in a discontinuous transmission mode.

19. The method of claim 2 wherein the reverse link comprises a primary pilot channel and at least one secondary pilot channel, and wherein the gain of the reverse traffic channel is fixed relative to the primary pilot channel.

20. The method of claim 19 wherein the gain of the reverse rate control channel is fixed relative to the sum of the transmit power on all reverse link pilot channels.

21. The method of claim 20 wherein the mobile station varies its transmit power on the primary pilot channel responsive to power control commands from at least one non-serving base station.

22. The method of claim 21 wherein the mobile station varies its transmit power on at least one secondary pilot channel responsive to power control commands from the serving base station such that the total transmit power on all reverse link pilot channels remains within predetermined limits.

23. The method of claim 1 wherein the first reverse link channel is a reverse pilot channel and the second reverse link channel is a reverse traffic channel.

24. The method of claim 1 wherein the first reverse link channel is a reverse rate control channel and the second reverse link channel is a reverse pilot channel.

25. A method of controlling the transmit powers of first and second reverse link channels of a mobile station by a serving and one or more non-serving base stations in a mobile communication system, comprising:

determining whether a given base station is a serving base station for forward link communications with the mobile station;

power controlling only the second reverse link channel if the base station is not the serving base station; and power controlling at least the first reverse link channel if the base station is the serving base station.

26. The method of claim 25 wherein the first reverse link channel is a reverse rate control channel and the second reverse link channel is a reverse traffic channel.

27. The method of claim 26 wherein the gain of the reverse rate control channel is fixed relative to a reverse pilot channel.

28. The method of claim 27 further comprising power controlling the reverse pilot channel if the base station determines that it is the serving base station.

29. The method of claim 26 wherein the gain of the reverse traffic channel is fixed relative to a reverse pilot channel.

30. The method of claim 29 further comprising power controlling the reverse pilot channel if the base station determines that it is a non-serving base station.

31. The method of claim 25 further comprising power controlling the reverse pilot channel by a non-serving base station if the mobile station is in a discontinuous transmission mode and the received power on the reverse pilot channel is above a predetermined threshold at the non-serving base station.

32. A method of controlling the transmit power of a mobile station in a wireless communication system during a soft handoff wherein the active set for the mobile station includes two or more base stations, the method comprising:

selecting one of the base stations in the active set as the serving base station for forward link communications with the mobile station;

receiving power control commands from the serving base station and at least one non-serving base station in the active set;

varying a first transmit power level of the mobile station on a reverse rate control channel responsive to power control commands from a serving base station, while conditionally ignoring power control commands from any non-serving base stations for purposes of power controlling the reverse rate control channel; and varying a second transmit power level of the mobile station on a reverse traffic channel responsive to power control commands from at least one non-serving base station.

33. The method of claim 32 wherein the gain of the reverse rate control channel is fixed relative to a reverse pilot channel and wherein the transmit power level of the mobile station on the reverse pilot channel is varied responsive to the power control commands from the serving base station.

34. The method of claim 32 wherein the gain of the reverse traffic control channel is fixed relative to a reverse pilot channel and wherein the transmit power level of the mobile station on the reverse pilot channel is varied responsive to the power control commands from the non-serving base station.

35. The method of claim 32 wherein varying the transmit power level of the mobile station on the reverse traffic channel responsive to power control commands from at least one non-serving base station comprises:

receiving power control commands from one or more non-serving base stations; and decreasing the second transmit power level if at least one of the non-serving base stations commands the mobile station to decrease its power level.

36. The method of claim 35 wherein varying the transmit power level of the mobile station on the reverse traffic channel responsive to power control commands from at least one non-serving base station further comprises increasing the second transmit power level if all of the non-serving base stations command the mobile station to increase its power level.

37. The method of claim 36 further comprising varying the transmit power level of the mobile station on the reverse traffic channel responsive to power control commands from the serving base station.

38. The method of claim 37 wherein varying the transmit power level of the mobile station on a reverse traffic channel responsive to power control commands from the serving base station comprises decreasing the transmit power level of the mobile station on the reverse traffic channel if the serving base station commands the mobile station to decrease its transmit power.

39. The method of claim 38 wherein varying the transmit power level of the mobile station on a reverse traffic channel responsive to power control commands from the serving base station further comprises increasing the transmit power of the mobile station on the reverse traffic channel if the serving base station and each non-serving base station in the active set commands the mobile station to increase its transmit power.

40. The method of claim 33 further comprising computing a first channel gain of the reverse traffic channel relative to the reverse pilot channel.

41. The method of claim 40 wherein varying a first transmit power level of the mobile station on a reverse rate control channel responsive to power control commands from a serving base station, while conditionally ignoring power control commands from any non-serving base stations for purposes of power controlling the reverse rate control channel comprises:
ignoring the power control commands from any non-serving base stations if the first channel gain meets a predetermined minimum gain; and
considering power control commands from one or more of the non-serving base stations for purposes of power controlling the reverse rate control channel if the first channel gain does not meet the predetermined minimum gain.

42. The method of claim 41 further comprising varying the transmit power level of the mobile station on the reverse rate control channel responsive to power control commands from at least one non-serving base station if the first channel gain is less than the predetermined minimum gain.

43. The method of claim 41 further comprising computing a second channel gain of the reverse rate control channel relative to the reverse pilot channel.

44. The method of claim 43 wherein varying a first transmit power level of the mobile station on a reverse rate control channel responsive to power control commands from a serving base station, while conditionally ignoring power control commands from any non-serving base stations for purposes of power controlling the reverse rate control channel further comprises:
ignoring the power control commands from any non-serving base stations if the second channel gain meets a normal gain;
considering power control commands from one or more of the non-serving base stations for purposes of power controlling the reverse pilot channel and the reverse rate control channel if the second channel gain does not meet the normal gain; and
considering power control commands from one or more of the non-serving base stations for purposes of power controlling the reverse rate control channel if the second channel gain does not meet the normal gain.

45. The method of claim 40 wherein varying a second transmit power level of the mobile station on a reverse traffic channel responsive to power control commands from at least one non-serving base station comprises:
comparing the channel gain to a predetermined maximum gain; and
varying the transmit power level of the mobile station on the reverse traffic channel if the channel gain is more than the predetermined maximum gain.

46. The method of claim 45 further comprising varying the transmit power level of the mobile station on the reverse traffic channel responsive to power control commands from the serving base station if the channel gain is greater than the predetermined maximum gain.

47. The method of claim 34 further comprising computing a gain ratio of the reverse rate control channel to the reverse pilot channel.

48. The method of claim 47 wherein varying a first transmit power level of the mobile station on a reverse rate control channel responsive to power control commands from a serving base station, while conditionally ignoring power control commands from any non-serving base stations for of power controlling the reverse rate control channel comprises:
ignoring the power control commands from any non-serving base stations if the channel gain meets a predetermined maximum gain; and
considering power control commands from one or more of the non-serving base stations for purposes of power controlling the reverse rate control channel if the channel gain does not meet the predetermined maximum gain.

49. The method of claim 48 further comprising varying the transmit power level of the mobile station on the reverse rate control channel responsive to power control commands from at least one non-serving base station if the channel gain is greater than the predetermined maximum gain.

50. The method of claim 49 wherein varying a second transmit power level of the mobile station on a reverse traffic channel responsive to power control commands from at least one non-serving base station comprises:
comparing the channel gain to a predetermined minimum gain; and
varying the transmit power level of the mobile station on the reverse traffic channel if the channel gain is not less than the predetermined minimum gain.

51. The method of claim 50 further comprising varying the transmit power level of the mobile station on the reverse traffic channel responsive to power control commands from the serving base station if the channel gain is less than the predetermined minimum gain.

52. The method of claim 32 further comprising varying the varying a transmit power level of the mobile station on the first reverse pilot channel responsive to power control commands from at least one non-serving base station if the mobile station is in a discontinuous transmission mode.

53. The method of claim 32 wherein the reverse link comprises a primary pilot channel and at least one secondary pilot channel, and wherein the gain of the reverse traffic channel is fixed relative to the primary pilot channel.

54. The method of claim 53 wherein the gain of the reverse rate control channel is fixed relative to the sum of the transmit power on all reverse link pilot channels.

55. The method of claim 54 wherein the mobile station varies its transmit power on the primary pilot channel responsive to power control commands from at least one non-serving base station.

56. The method of claim 55 wherein the mobile station varies its transmit power on at least one secondary pilot channel responsive to power control commands from the serving base station such that the total transmit power on all reverse link pilot channels remains within predetermined limits.

57. A mobile station comprising:
a receiver to receive power control commands from a serving base station and at least one non-serving base station, the serving and non-serving base stations forming an active set for the mobile station;
power control logic to:
vary a first transmit power level of the mobile station on a first reverse link channel responsive to power control commands from the serving base station, while conditionally ignoring power control commands from any non-serving base stations for purposes of power controlling the first reverse link channel;

vary a second transmit power level of the mobile station on a second reverse link channel responsive to power control commands from at least one non-serving base station; and a transmitter to transmit signals on the first and second reverse link channels at the first and second transmit power levels respectively.

58. The mobile station of claim 57 wherein the first reverse link channel is a reverse rate control channel and the second reverse link channel is a reverse traffic channel.

59. The mobile station of claim 58 wherein the gain of the reverse rate control channel is fixed relative to a reverse pilot channel and wherein the power control logic varies the transmit power level of the mobile station on the reverse pilot channel responsive to the power control commands from the serving base station.

60. The mobile station of claim 58 wherein the gain of the reverse traffic channel is fixed relative to a reverse pilot channel and wherein the power control logic varies the transmit power level of the mobile station on the reverse pilot channel responsive to the power control commands from the at least one non-serving base station.

61. The mobile station of claim 57 wherein the power control logic decreases the second transmit power level if at least one of the non-serving base stations in the active set commands the mobile station to decrease its power level.

62. The mobile station of claim 61 wherein the power control logic increases the second transmit power level if all of the non-serving base stations in the active set command the mobile station to increase its power level.

63. The mobile station of claim 57 wherein the power control logic varies the transmit power of the mobile station on the second reverse link channel responsive to power control commands from all the base stations in the active set for the mobile station, including the serving base station.

64. The mobile station of claim 57 wherein the power control logic decreases the second transmit power level if the serving base station or any one of the non-serving base stations commands the mobile station to decrease its transmit power on the reverse traffic channel.

65. The mobile station of claim 57 wherein the power control logic increases the second transmit power level if all the base stations in its active set command the mobile station to increase its transmit power on the reverse traffic channel.

66. The mobile station of claim 57 further comprising computing a first channel gain of one of the first and second reverse link channels relative to a third reverse link channel.

67. The mobile station of claim 66 wherein the power control logic is operative to:
determine if the first channel gain meets a predetermined criterion; and
vary the transmit power level of the mobile station on the first reverse link channel if the first channel gain meets the predetermined criterion.

68. The mobile station of claim 67 further wherein the power control logic varies the first transmit power level of the mobile station on the first reverse link channel responsive to power control commands from at least one non-serving base station if the first channel gain does not meet the predetermined criterion.

69. The method of claim 67 further comprising computing a second channel gain of one of the first and second reverse link channels relative to the third reverse link channel.

70. The method of claim 69 wherein varying a first transmit power level of the mobile station on a first reverse link channel responsive to power control commands from a serving base station, while conditionally ignoring power control commands from any non-serving base stations for purposes of power controlling the first reverse link channel comprises:
ignoring the power control commands from any non-serving base stations if the first channel gain meets a first predetermined criterion;
ignoring the power control commands from any non-serving base stations if the second channel gain meets a second predetermined criterion; and
considering power control commands from one or more of the non-serving base stations for purposes of power controlling the first reverse link channel if either of the first and second channel gains does not meet the first and second predetermined criterion respectively.

71. The mobile station of claim 66 wherein the power control logic is operative to:
determine if the first channel gain meets a predetermined criterion; and
vary the transmit power level of the mobile station on the second reverse link channel if the first channel gain meets the predetermined criterion.

72. The mobile station of claim 71 further wherein the power control logic varies the second transmit power level of the mobile station on the second reverse link channel responsive to power control commands from the serving base station if the first channel gain does not meet the predetermined criterion.

73. The mobile station of claim 57 wherein the power control logic varies the transmit power of the mobile station on the first reverse link channel responsive to power control commands from non-serving base stations when the mobile station is in a discontinuous transmission mode.

74. The mobile station of claim 58 wherein the reverse link comprises a primary pilot channel and at least one secondary pilot channel, and wherein the gain of the reverse traffic channel is fixed relative to the primary pilot channel.

75. The mobile station of claim 74 wherein the gain of the reverse rate control channel is fixed relative to the sum of the transmit power on all reverse link pilot channels.

76. The mobile station of claim 75 wherein the power control logic varies the transmit power of the mobile station of the primary pilot channel responsive to power control commands from at least one non-serving base station.

77. The mobile station of claim 76 wherein the power control logic varies the transmit power of at least one secondary pilot channel responsive to power control commands from the serving base station such that the total transmit power on all reverse link pilot channels remains within predetermined limits.

78. A base station for a wireless communication network, comprising:
a receiver to receive signals from a mobile station on first and second reverse link channels at first and second received power levels respectively;
power control logic to:
determine whether the base station is a serving base station for forward link communications with the mobile station;

generate power control commands to power control at least a first reverse link channel if the base station is the serving base station;

generate power control commands to power control only a second reverse link channel if the base station is a non-serving base station; and a transmitter to transmit the power control commands to the mobile station.

79. The base station of claim 78 wherein the first reverse link channel is a reverse rate control channel and the second reverse link channel is a reverse traffic channel.

80. The base station of claim 79 wherein the gain of the reverse rate control channel is fixed relative to a reverse pilot channel.

81. The base station of claim 80 wherein the power control logic generates power control commands to power control the reverse pilot channel if the base station determines that it is the serving base station.

82. The base station of claim 78 wherein the power control logic generates a first power control command to power control a reverse pilot channel and a second power control command to power control a reverse rate control channel if the base determines that it is the serving base station.

83. The base station of claim 79 wherein the gain of the reverse traffic channel is fixed relative to a reverse pilot channel.

84. The base station of claim 83 wherein the power control logic generates power control commands to power control the reverse pilot channel if the base station determines that it is a non-serving base station.

85. The base station of claim 78 wherein the power control logic for a non-serving base station generates power control commands to power control the reverse pilot channel if the mobile station is in a discontinuous transmission mode and received power on the reverse pilot channel is above a predetermined threshold at the non-serving base station.

* * * * *

UNITED STATES PATENT AND TRADEMARK OFFICE
CERTIFICATE OF CORRECTION

| | | |
|---|---|---|
| PATENT NO. | : 7,190,964 B2 | Page 1 of 2 |
| APPLICATION NO. | : 10/040542 | |
| DATED | : March 13, 2007 | |
| INVENTOR(S) | : Damnjanovic et al. | |

It is certified that error appears in the above-identified patent and that said Letters Patent is hereby corrected as shown below:

In the Drawings, Sheet 7 of 11, in FIG. 7, delete "SERVIING" and insert -- SERVING --, therefor.

In the Drawings, Sheet 7 of 11, in FIG. 7, delete "NON-SERVIING" and insert -- NON-SERVING --, therefor.

In Column 3, Line 57, insert -- best -- before "reverse".

In Column 10, Line 44, delete "sector" before "sector. DRC".

In Column 13, Line 33, delete "TIP" and insert -- T/P --, therefor.

In Column 15, Line 35, delete "Pmax" and insert -- $P_{MAX}$ --, therefor.

In Column 15, Line 55, delete "Pmax" and insert -- $P_{MAX}$ --, therefor.

In Column 19, Line 33, delete "TIP" and insert -- T/P --, therefor.

In Column 21, Lines 44-50, in Table 4, delete

"

| Serving | Non-Serving | R-PPICH | R-PPICH + R-SPICH | R-TCH | R-RCCH |
|---|---|---|---|---|---|
| Up | Up | $+\Delta$ dB | $+\Delta$ dB | $+\Delta$ dB | $+\Delta$ dB |
| Up | Down | $-\Delta$ dB | $+\Delta$ dB$_{12}$ | $-\Delta$ dB | $+\Delta$ dB$_{12}$ |
| Down | Up | $+\Delta$ dB$_{13}$ | $-\Delta$ dB | $+\Delta$ dB$_{13}$ | $-\Delta$ dB |
| Down | Down | $-\Delta$ dB | $-\Delta$ dB | $-\Delta$ dB | $-\Delta$ dB |

" and insert --

| Serving | Non-Serving | R-PPICH | R-PPICH + R-SPICH | R-TCH | R-RCCH |
|---|---|---|---|---|---|
| Up | Up | $+\Delta$ dB | $+\Delta$ dB | $+\Delta$ dB | $+\Delta$ dB |
| Up | Down | $-\Delta$ dB | $+\Delta$ dB$^{12}$ | $-\Delta$ dB | $+\Delta$ dB$^{12}$ |
| Down | Up | $+\Delta$ dB$^{13}$ | $-\Delta$ dB | $+\Delta$ dB$^{13}$ | $-\Delta$ dB |
| Down | Down | $-\Delta$ dB | $-\Delta$ dB | $-\Delta$ dB | $-\Delta$ dB |

--, therefor.

In column 24, in Table 5, under "R-PICH", Line 4, delete "$+\Delta$ dB$_{14}$" and insert -- $+\Delta$ dB$^{14}$ --, therefor.

UNITED STATES PATENT AND TRADEMARK OFFICE
CERTIFICATE OF CORRECTION

PATENT NO. : 7,190,964 B2
APPLICATION NO. : 10/040542
DATED : March 13, 2007
INVENTOR(S) : Damnjanovic et al.

It is certified that error appears in the above-identified patent and that said Letters Patent is hereby corrected as shown below:

In Column 30, Line 8, in Claim 48, after "for" insert -- purposes --.

Signed and Sealed this

Seventeenth Day of June, 2008

JON W. DUDAS
*Director of the United States Patent and Trademark Office*